(12) United States Patent
Togashi

(10) Patent No.: US 7,843,679 B2
(45) Date of Patent: Nov. 30, 2010

(54) MULTILAYER CAPACITOR HAVING LOW IMPEDANCE OVER A WIDE FREQUENCY BAND

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 336 days.

(21) Appl. No.: 12/136,364

(22) Filed: Jun. 10, 2008

(65) Prior Publication Data

US 2009/0015986 A1 Jan. 15, 2009

(30) Foreign Application Priority Data

Jul. 9, 2007 (JP) .............................. 2007-179873

(51) Int. Cl.
*H01G 4/005* (2006.01)
*H01G 4/06* (2006.01)
*H01G 4/228* (2006.01)

(52) U.S. Cl. .................. 361/303; 361/321.2; 361/306.3
(58) Field of Classification Search .................. 361/303, 361/304, 305, 308.1, 309, 321.2, 321.3, 321.4, 361/301.2, 321.5, 306.1, 306.3, 306.2
See application file for complete search history.

(56) References Cited

U.S. PATENT DOCUMENTS

| 3,444,436 | A | * | 5/1969 | Coda ........................... 361/773 |
| 6,052,272 | A | | 4/2000 | Kuroda et al. |
| 7,027,288 | B2 | * | 4/2006 | Shimizu et al. ............. 361/303 |
| 7,310,217 | B2 | * | 12/2007 | Takashima et al. ....... 361/306.3 |
| 2008/0084651 | A1 | * | 4/2008 | Oguni et al. ................. 361/303 |
| 2008/0174931 | A1 | * | 7/2008 | Skamser et al. ............. 361/272 |

FOREIGN PATENT DOCUMENTS

| JP | A-10-261546 | 9/1998 |
| JP | A-2000-106322 | 4/2000 |
| JP | A 2004-140183 | 5/2004 |
| WO | WO 2005020256 A1 * | 3/2005 |

* cited by examiner

*Primary Examiner*—Eric Thomas
*Assistant Examiner*—David M Sinclair
(74) *Attorney, Agent, or Firm*—Oliff & Berridge, PLC

(57) ABSTRACT

A multilayer capacitor has a capacitor element body in which a plurality of insulator layers are laminated, first and second terminal electrodes, a first internal electrode group, and a second internal electrode group. The first and second terminal electrodes are disposed on an external surface extending in a direction parallel to a laminating direction of the insulator layers, among external surfaces of the capacitor element body. The first internal electrode group has a first internal electrode connected to the first terminal electrode, and a second internal electrode connected to the second terminal electrode. The second internal electrode group has a third internal electrode connected to the first terminal electrode, a fourth internal electrode connected to the second terminal electrode, and at least one intermediate internal electrode not connected to the first and second terminal electrodes. The first and second internal electrodes are arranged with the insulator layer in between so as to form a capacitance component between the first and second internal electrodes. The third and fourth internal electrodes and the intermediate internal electrode are arranged with the insulator layer in between so as to form two or more capacitance components between the third and fourth internal electrodes.

14 Claims, 19 Drawing Sheets

(a)

(b)

(a)

(b)

(a)

(b)

MULTILAYER CAPACITOR HAVING LOW
IMPEDANCE OVER A WIDE FREQUENCY
BAND

BACKGROUND OF THE INVENTION

1. Field of the Invention

The present invention relates to a multilayer capacitor.

2. Related Background Art

A known multilayer capacitor is one having a capacitor element body in which a plurality of insulator layers are laminated, a plurality of first internal electrodes and second internal electrodes arranged as opposed with the insulator layer in between, and first and second terminal electrodes disposed on an external surface extending in a direction parallel to a laminating direction of the insulator layers, among external surfaces of the capacitor element body, wherein the plurality of first internal electrodes are connected to the first terminal electrode and wherein the plurality of second internal electrodes are connected to the second terminal electrode (e.g., cf. Japanese Patent Application Laid-open No. 2004-140183). Since the first and second terminal electrodes are disposed on the same external surface in the ceramic electronic component described in Japanese Patent Application Laid-open No. 2004-140183, current pathways established in the multilayer capacitor are relatively short, so that the equivalent series inductance (ESL) can be reduced.

SUMMARY OF THE INVENTION

Incidentally, the multilayer capacitor to be connected to a power-supply circuit or the like in electronic equipment in order to remove noise is required to produce the noise removal effect over a wide frequency band. For this reason, the multilayer capacitor of this type is required to have low impedance over a wide band, in order to effectively remove noise in the wide frequency band. In the multilayer capacitor described in Japanese Patent Application Laid-open No. 2004-140183, however, nothing is considered for reduction in impedance over the wide band. Therefore, the multilayer capacitor described in the mentioned Laid-open No. 2004-140183 fails to achieve reduction in impedance over the wide band and it can be difficult to effectively remove noise in the wide frequency band.

The present invention has been accomplished in order to solve the above-described problem and an object of the present invention is to provide a multilayer capacitor having low impedance over a wide band, while keeping the equivalent series inductance low.

A multilayer capacitor according to the present invention is a multilayer capacitor comprising: a capacitor element body in which a plurality of insulator layers are laminated; first and second terminal electrodes disposed on an external surface extending in a direction parallel to a laminating direction of the insulator layers, among external surfaces of the capacitor element body; a first internal electrode group comprising a first internal electrode connected to the first terminal electrode, and a second internal electrode connected to the second terminal electrode; and a second internal electrode group comprising a third internal electrode connected to the first terminal electrode, a fourth internal electrode connected to the second terminal electrode, and at least one intermediate internal electrode not connected to the first and second terminal electrodes; wherein the first and second internal electrodes are arranged with the insulator layer in between so as to form one capacitance component between the first and second internal electrodes; and wherein the third and fourth internal electrodes and the intermediate internal electrode are arranged with the insulator layer in between so as to form two or more capacitance components between the third and fourth internal electrodes.

In the multilayer capacitor according to the present invention, the one capacitance component is formed in the first internal electrode group and the two or more capacitance components are formed in the second internal electrode group. In this case, the two or more capacitance components are connected in series, and thus the total capacitance of the two or more capacitance components is smaller than the capacitance of the one capacitance component. Therefore, the self-resonant frequency due to the one capacitance component in the first internal electrode group is different from that due to the two or more capacitance components in the second internal electrode group, whereby low impedance is achieved over a wide frequency band. The self-resonant frequency due to the two or more capacitance components is higher than that due to the one capacitance component because the total capacitance of the two or more capacitance components is smaller than the capacitance of the one capacitance component.

Since in the present invention the first and second terminal electrodes are disposed on the one external surface, current pathways established in the multilayer capacitor are relatively short, so that the equivalent series inductance of the multilayer capacitor can be reduced.

Preferably, the second internal electrode group comprises a first intermediate internal electrode opposed to the third and fourth internal electrodes, as the at least one intermediate internal electrode. The multilayer capacitor is also preferably configured as follows: the second internal electrode group comprises second to fourth intermediate internal electrodes as the at least one intermediate internal electrode, the second intermediate internal electrode is opposed to the third internal electrode and the third intermediate internal electrode, and the fourth intermediate internal electrode is opposed to the fourth internal electrode and the third intermediate internal electrode.

Preferably, the second internal electrode group includes two types of internal electrode groups, an internal electrode group having a first intermediate internal electrode and an internal electrode group having second to fourth intermediate internal electrodes, the first intermediate internal electrode is opposed to the third and fourth internal electrodes, the second intermediate internal electrode is opposed to the third internal electrode and the third intermediate internal electrode, and the fourth intermediate internal electrode is opposed to the fourth internal electrode and the third intermediate internal electrode. In this case, the second internal electrode group includes the two types of internal electrode groups, whereby low impedance is achieved over a wider frequency band. The number of capacitance components connected in series is larger in the internal electrode group having the second to fourth intermediate internal electrodes than in the internal electrode group having the first intermediate internal electrode, and the total capacitance thereof is thus smaller. Therefore, the self-resonant frequency due to the one capacitance component in the first internal electrode group, the self-resonant frequency due to the two or more capacitance components in the internal electrode group having the first intermediate internal electrode, and the self-resonant frequency due to the two or more capacitance components in the internal electrode group having the second to fourth intermediate internal electrodes are different from each other.

Preferably, the first internal electrode has a first lead portion connected to the first terminal electrode, the second internal electrode has a second lead portion connected to the second terminal electrode, the third internal electrode has a third lead portion connected to the first terminal electrode, the fourth internal electrode has a fourth lead portion connected to the second terminal electrode, and a width of the third and fourth lead portions is larger than a width of the first and second lead portions. In this case, the equivalent series inductance of the two or more capacitance components in the second internal electrode group is lower than the equivalent series inductance of the one capacitance component in the first internal electrode group. As a consequence, it becomes feasible to further reduce the equivalent series inductance of the multilayer capacitor.

Incidentally, the equivalent series inductance can also be reduced by setting the width of the first and second lead portions wider than the width of the third and fourth lead portions. In general, the self-resonant frequency of a capacitor becomes higher with decrease in the equivalent series inductance of the capacitor. Therefore, when the width of the first and second lead portions is larger than the width of the third and fourth lead portions, the self-resonant frequency due to the one capacitance component becomes close to the self-resonant frequency due to the two or more capacitance components, which inhibits the reduction in impedance over the wide band.

Preferably, the first internal electrode has a first lead portion connected to the first terminal electrode, the second internal electrode has a second lead portion connected to the second terminal electrode, the third internal electrode has a third lead portion connected to the first terminal electrode, the fourth internal electrode has a fourth lead portion connected to the second terminal electrode, and a distance between the third lead portion and the fourth lead portion is smaller than a distance between the first lead portion and the second lead portion. In this case, the equivalent series inductance of the two or more capacitance components in the second internal electrode group is lower than the equivalent series inductance of the one capacitance component in the first internal electrode group. As a result, it becomes feasible to further reduce the equivalent series inductance of the multilayer capacitor.

Incidentally, the equivalent series inductance can also be reduced by setting the distance between the first lead portion and the second lead portion smaller than the distance between the third lead portion and the fourth lead portion. The self-resonant frequency of a capacitor becomes higher with decease in the equivalent series inductance of the capacitor, as described above. Therefore, when the distance between the first lead portion and the second lead portion is smaller than the distance between the third lead portion and the fourth lead portion, the self-resonant frequency due to the one capacitance component becomes close to that due to the two or more capacitance components, which inhibits the reduction in impedance over the wide band.

Preferably, the first and second internal electrode groups are arranged along the laminating direction of the insulator layers in the capacitor element body.

Preferably, the external surface on which the first and second terminal electrodes are disposed constitutes a mounted surface to be opposed to another component.

The present invention successfully provides the multilayer capacitor having low impedance over a wide band while keeping the equivalent series inductance low.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

First Embodiment

Figure 1:
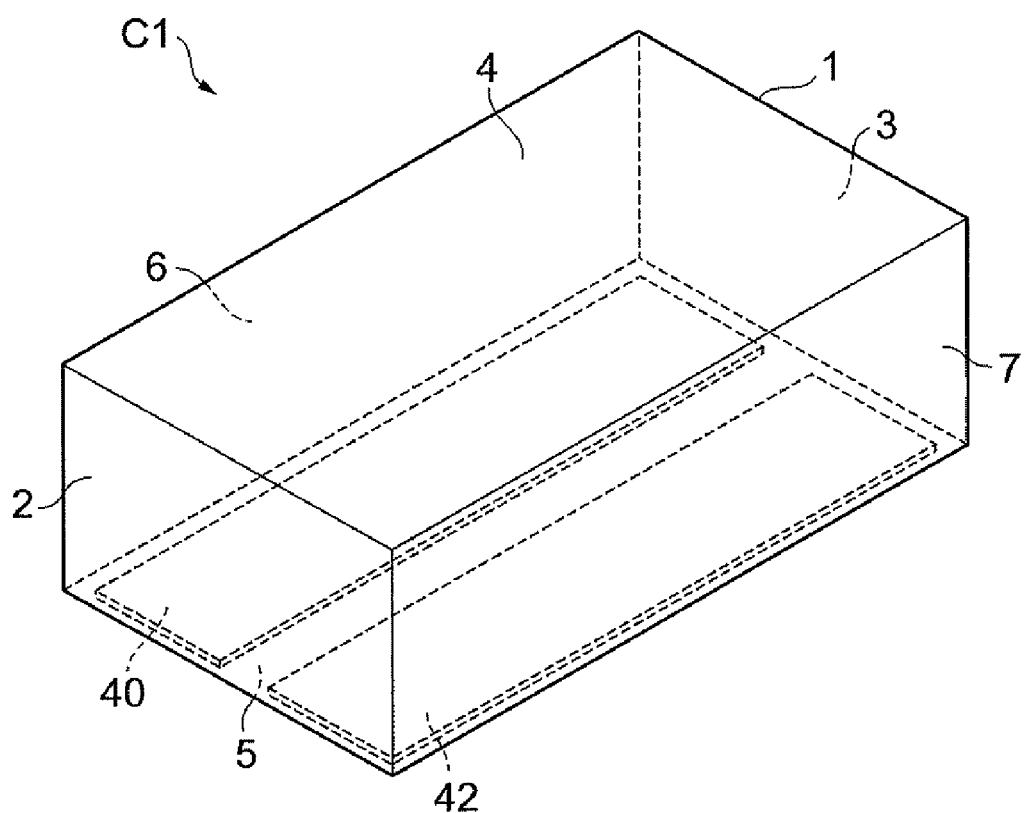
FIG. 1 is a schematic perspective view showing a multilayer capacitor according to the first embodiment.
Figure 2:
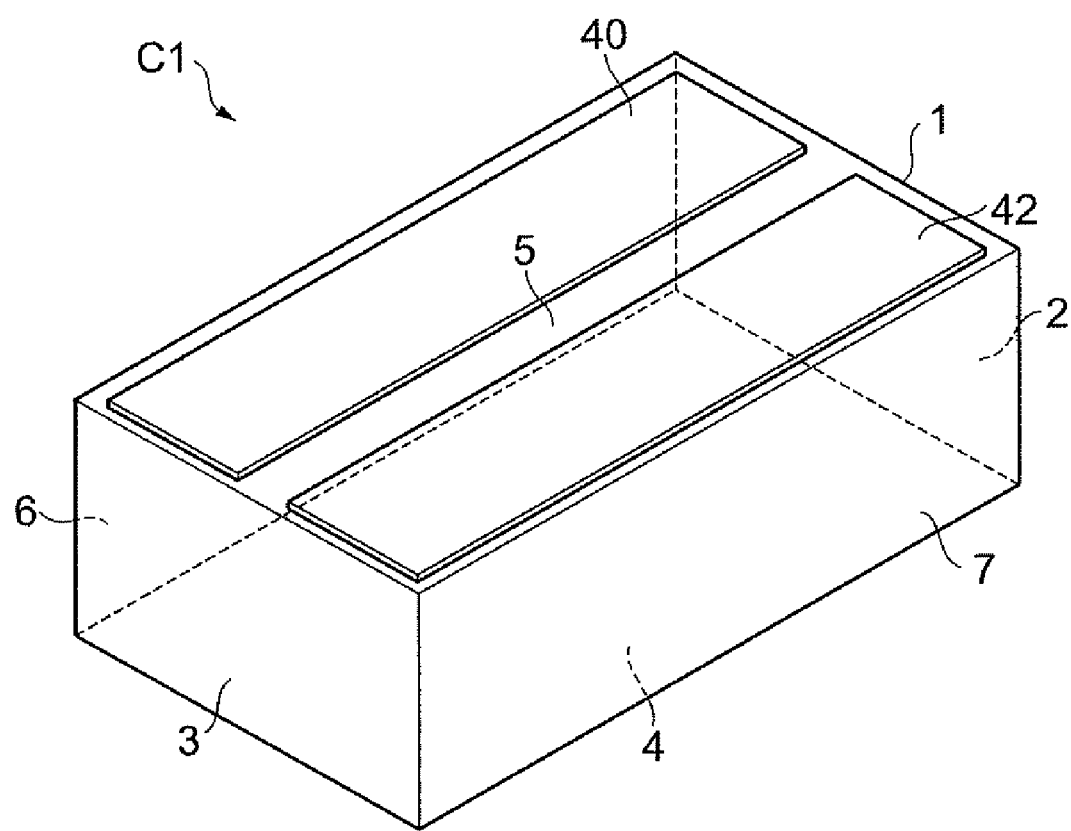
FIG. 2 is a schematic perspective view showing the multilayer capacitor according to the first embodiment.
Figure 3:
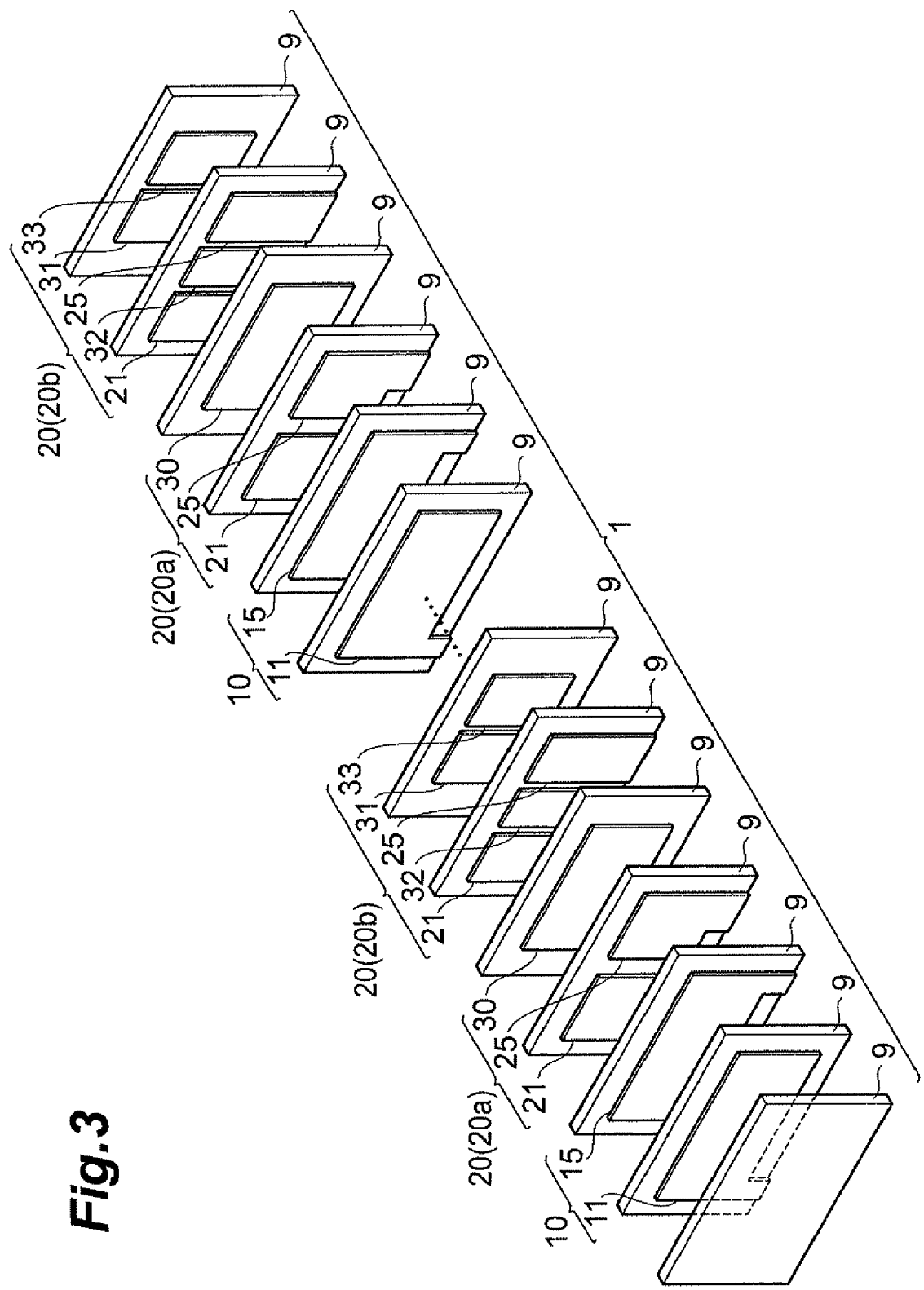
FIG. 3 is an exploded perspective view of a capacitor element body in the multilayer capacitor according to the first embodiment.
Figure 4:
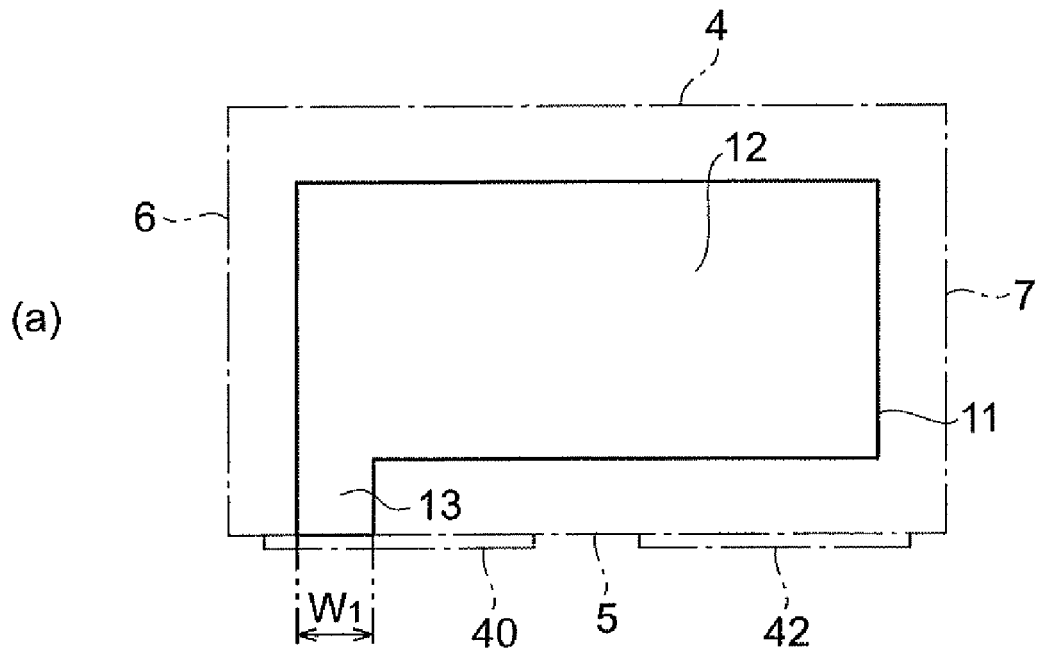
FIG. 4 is a drawing showing configurations of internal electrodes.
Figure 4:
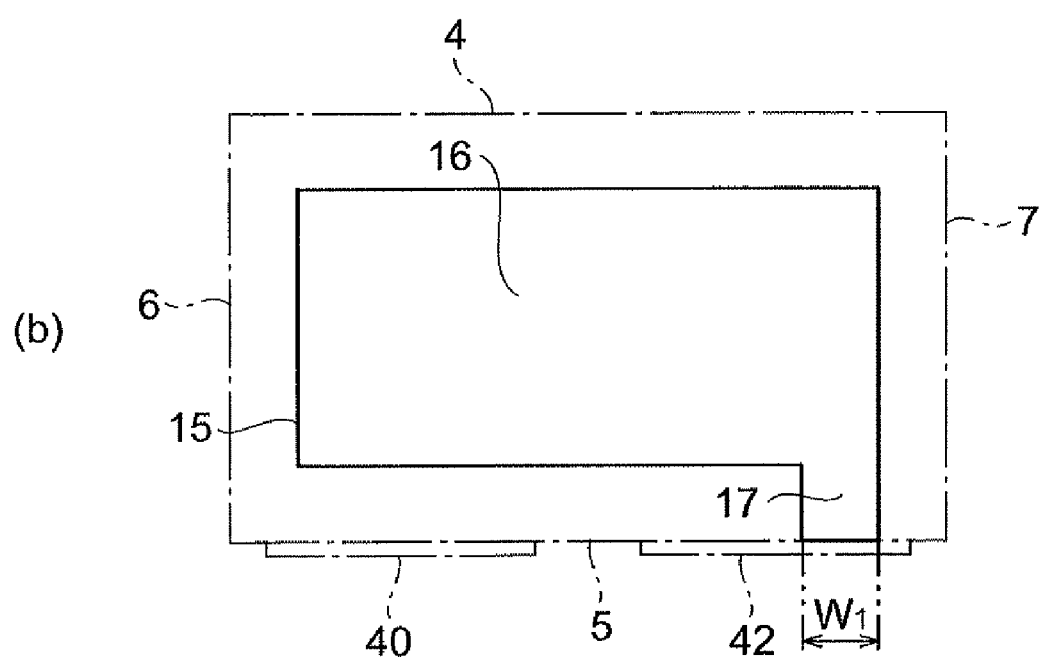
Figure 5:
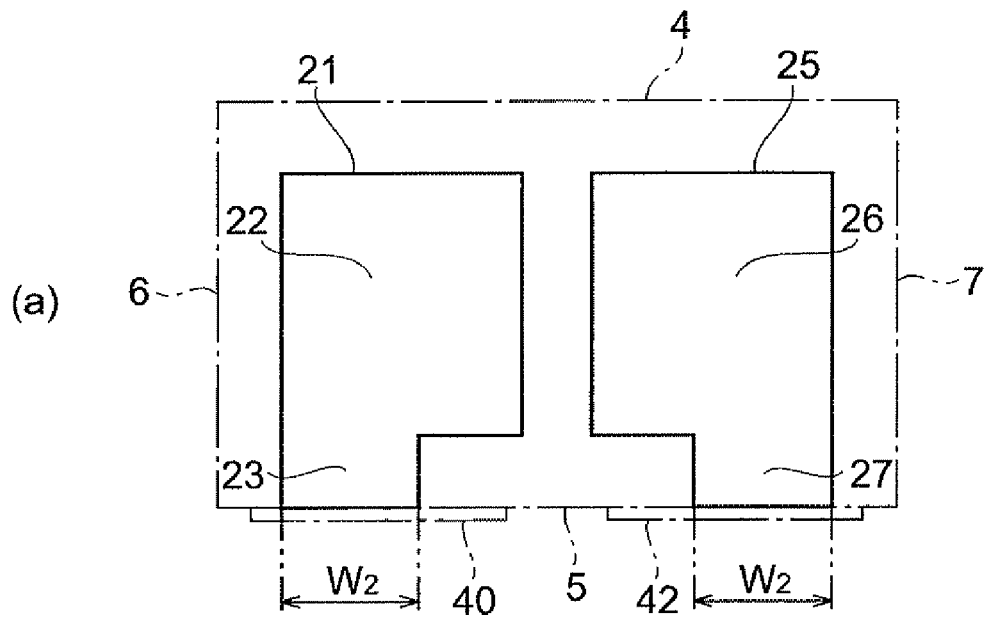
FIG. 5 is a drawing showing configurations of internal electrodes.
Figure 5:
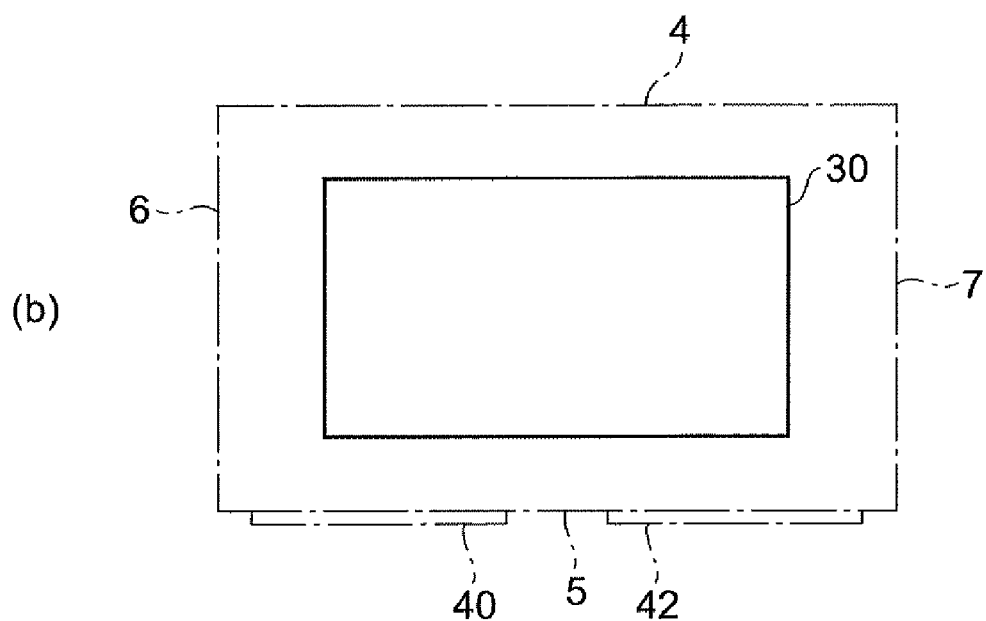
Figure 6:
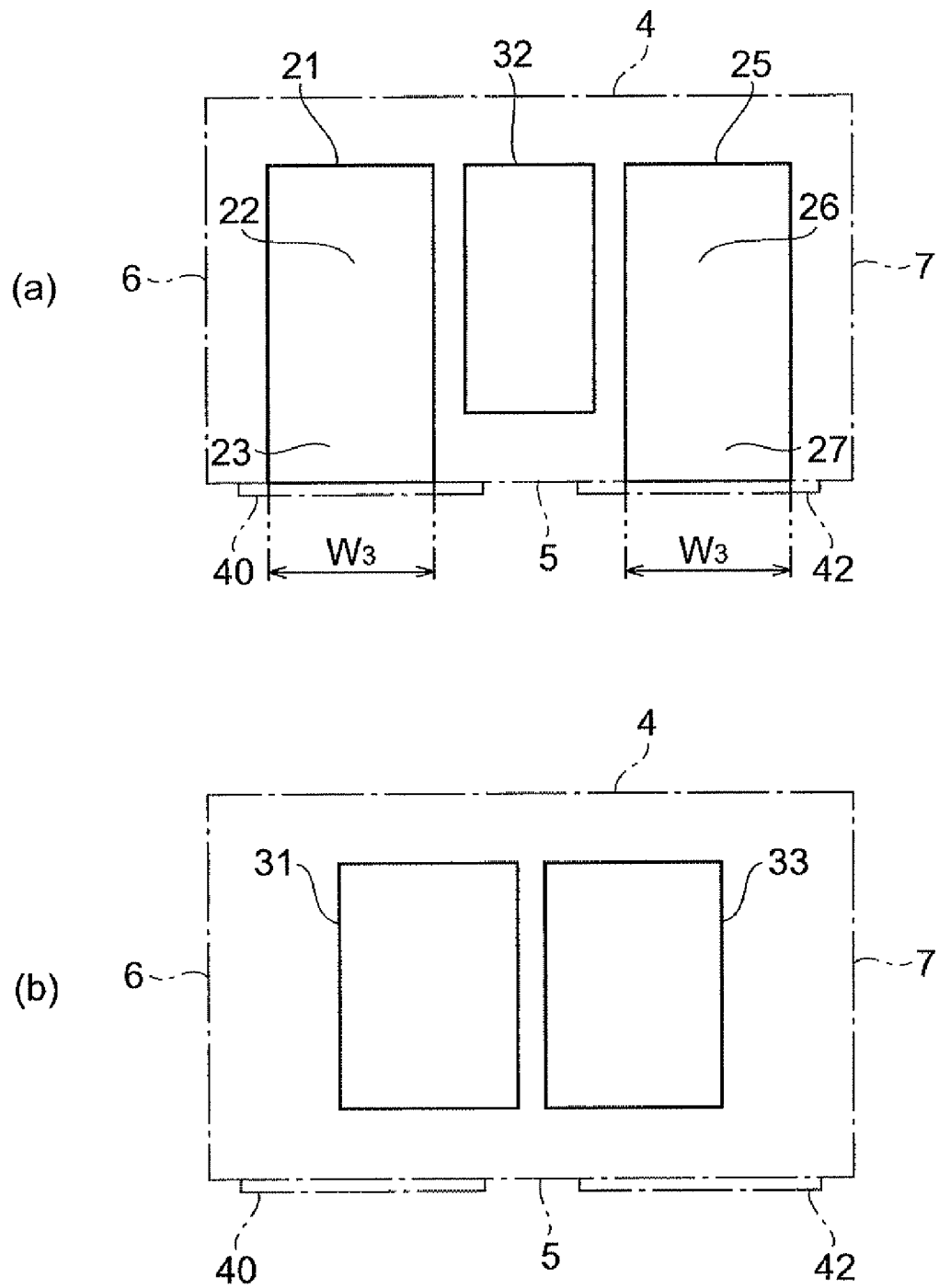
FIG. 6 is a drawing showing configurations of internal electrodes.

A configuration of a multilayer capacitor C1 according to the first embodiment will be described with reference to FIGS. 1 to 6. FIG. 1 and FIG. 2 are schematic perspective views showing the multilayer capacitor according to the first embodiment. FIG. 3 is an exploded perspective view of a capacitor element body in the multilayer capacitor of the first embodiment. In FIGS. 4 to 6 each of (a) and (b) is a view showing a configuration of an internal electrode.

The multilayer capacitor C1, as shown in FIGS. 1 and 2, is provided with a capacitor element body 1 of a nearly rectangular parallelepiped shape, a first terminal electrode 40, and a second terminal electrode 42.

The capacitor element body 1 includes a first end face 2 and a second end face 3 facing each other, a first side face 4 and a second side face 5 facing each other, and a third side face 6 and a fourth side face 7 facing each other. The first side face 4 and the second side face 5 extend in a first direction in which the first and second end faces 2, 3 face each other, so as to connect the first and second end faces 2, 3. The third side face 6 and the fourth side face 7 extend in the first direction in which the first and second end faces 2, 3 face each other, so as to connect the first and second end faces 2, 3. The first direction, a second direction in which the first and second side faces 4, 5 face other, and a third direction in which the third and fourth side faces 6, 7 face each other, are orthogonal to each other. In the present embodiment the second side face 5 is a mounted surface to be opposed to another component (e.g., a circuit board, an electronic component, or the like).

The capacitor element body 1, as shown in FIG. 3, has a plurality of insulator layers 9. The capacitor element body 1 is composed of a laminate in which the insulator layers 9 are laminated in the first direction in which the first and second end faces 2, 3 face each other, and has the dielectric property. Each insulator layer 9 is composed, for example, of a sintered body of a ceramic green sheet containing a dielectric ceramic (a dielectric ceramic such as a $BaTiO_3$ type ceramic, a $Ba(Ti, Zr)O_3$ type ceramic, or a $(Ba, Ca)TiO_3$ type ceramic). The insulator layers 9 are integrally formed in the practical multilayer capacitor C1 so that no border can be visually recognized between them.

The multilayer capacitor C1, as shown in FIG. 3, is provided with a plurality of first internal electrode groups 10 and a plurality of second internal electrode groups 20. Each first internal electrode group 10 has a first internal electrode 11 and a second internal electrode 15. Each second internal electrode group 20 has a third internal electrode 21, a fourth internal electrode 25, and a first intermediate internal electrode 30, or, the third internal electrode 21, the fourth internal electrode 25, a second intermediate internal electrode 31, a third intermediate internal electrode 32, and a fourth intermediate internal electrode 33. The internal electrodes 11, 15, 21, 25, 30-33 (first internal electrode groups 10 and second internal electrode groups 20) each are located inside the capacitor element body 1. The first and second internal electrode groups 10, 20 are arranged along the first direction in the capacitor element body 1. Each internal electrode 11, 15, 21, 25, 30-33 is made of an electrically conductive material (e.g., a base metal Ni, or the like) usually used as internal electrodes in a multilayer electric element. Each internal electrode 11, 15, 21, 25, 30-33 is constructed as a sintered body of an electroconductive paste containing the above-described electrically conductive material.

Each first internal electrode 11, as shown in FIG. 4(a), has a main electrode portion 12, and a first lead portion 13 extending from the main electrode portion 12 so that an end thereof is exposed in the second side face 5. The main electrode portion 12 and the first lead portion 13 are integrally formed. The first lead portion 13 extends from a portion near the third side face 6 in the longer side of the main electrode portion 12 on the second side face 5 side, to the second side face 5.

Each second internal electrode 15, as shown in FIG. 4(b), has a main electrode portion 16 of a rectangular shape, and a second lead portion 17 extending from the main electrode portion 16 so that an end thereof is exposed in the second side face 5. The main electrode portion 16 and the second lead portion 17 are integrally formed. The second lead portion 17 extends from a portion near the fourth side face 7 in the longer side of the main electrode portion 16 on the second side face 5, to the second side face 5.

The main electrode portion 12 of the first internal electrode 11 and the main electrode portion 16 of the second internal electrode 15 are opposed to each other with the insulator layer 9 in between. An overlap of the insulator layer 9 with the main electrode portion 12 of the first internal electrode 11 and the main electrode portion 16 of the second internal electrode 15 is a region that substantially produces one capacitance component. Namely, the first internal electrode 11 and the second internal electrode 15 are arranged with the insulator layer 9 in between so as to form one capacitance component between the first and second internal electrodes 11, 15.

Each third internal electrode 21, as shown in FIG. 5(a), has a main electrode portion 22 of a rectangular shape, and a third lead portion 23 extending from the main electrode portion 22 so that an end thereof is exposed in the second side face 5. The main electrode portion 22 and the third lead portion 23 are integrally formed. The third lead portion 23 extends from a portion near the third side face 6 in the longer side of the main electrode portion 22 on the second side face 5 side, to the second side face 5. The area of the main electrode portion 22 is smaller than the area of the main electrode portion 12, 16.

Each fourth internal electrode 25, as shown in FIG. 5(a), has a main electrode portion 26 of a rectangular shape, and a fourth lead portion 27 extending from the main electrode portion 26 so that an end thereof is exposed in the second side face 5. The main electrode portion 26 and the fourth lead portion 27 are integrally formed. The fourth lead portion 27 extends from a portion near the fourth side face 7 in the longer side of the main electrode portion 26 on the second side face 5 side, to the second side face 5. The third internal electrode 21 and the fourth internal electrode 25 are located in an identical layer. The area of the main electrode portion 26 is smaller than the area of the main electrode portion 12, 16.

The first intermediate internal electrode 30 is located in a layer different from that of the third and fourth internal electrodes 21, 25. Namely, the first intermediate internal electrode 30 is opposed to the third and fourth internal electrodes 21, 25 (main electrode portions 22, 26) with the insulator layer 9 in between.

An overlap of the insulator layer 9 with the main electrode portion 22 of the third internal electrode 21 and the first intermediate internal electrode 30 is a region that substantially produces one capacitance component. An overlap of the insulator layer 9 with the main electrode portion 26 of the fourth internal electrode 25 and the first intermediate internal electrode 30 is a region that substantially produces one capacitance component. Namely, the third and fourth internal electrodes 21, 25 and the first intermediate internal electrode 30 are arranged with the insulator layer 9 in between so as to form two capacitance components between the third and fourth internal electrodes 21, 25. The two capacitance components formed between the third and fourth internal electrodes 21, 25 are connected in series.

The third intermediate internal electrode 32, as shown in FIG. 6(a), is located in the same layer as the third and fourth internal electrodes 21, 25 are. The third intermediate internal electrode 32 is located between the third and fourth internal electrodes 21, 25. The third and fourth internal electrodes 21, 25 and the third intermediate internal electrode 32 are arranged in the order of the third internal electrode 21, the third intermediate internal electrode 32, and the fourth internal electrode 25 in the direction from the third side face 6 to the fourth side face 7.

The second and fourth intermediate internal electrodes 31, 33, as shown in FIG. 6(b), are located in an identical layer but layer different from that of the third and fourth internal electrodes 21, 25 and the third intermediate internal electrode 32. Namely, the second intermediate internal electrode 31 is opposed to the third internal electrode 21 (main electrode portion 22) and the third intermediate internal electrode 32 with the insulator layer 9 in between. The fourth intermediate internal electrode 33 is opposed to the fourth internal electrode 25 (main electrode portion 26) and the third intermediate internal electrode 32 with the insulator layer 9 in between.

An overlap of the insulator layer 9 with the main electrode portion 22 of the third internal electrode 21 and the second intermediate internal electrode 31 is a region that substantially produces one capacitance component. An overlap of the insulator layer 9 with the second intermediate internal electrode 31 and the third intermediate internal electrode 32 is a region that substantially produces one capacitance component. An overlap of the insulator layer 9 with the third intermediate internal electrode 32 and the fourth intermediate internal electrode 33 is a region that substantially produces one capacitance component. An overlap of the insulator layer 9 with the main electrode portion 26 of the fourth internal electrode 25 and the fourth intermediate internal electrode 33 is a region substantially produces one capacitance component. Namely, the third internal electrode 21, the fourth internal electrode 25, and the second to fourth intermediate internal electrodes 31-33 are arranged with the insulator layer 9 in between so as to form four capacitance components between the third and fourth internal electrodes 21, 25. The four capacitance components formed between the third and fourth internal electrodes 21, 25 are connected in series.

The second internal electrode groups 20 include two types of internal electrode groups, second internal electrode groups 20a having the third and fourth internal electrodes 21, 25 and the first intermediate internal electrode 30, and second internal electrode groups 20b having the third and fourth internal electrodes 21, 25 and the second to fourth intermediate internal electrodes 31-33.

The widths ($W_2$, $W_3$) of the third and fourth lead portions 23, 27 are set wider than the width ($W_1$) of the first and second lead portions 13, 17. Namely, the length of the exposed part of the third and fourth lead portions 23, 27 in the second side face 5 is set longer than the length of the exposed part of the first and second lead portions 13, 17 in the second side face 5. The width ($W_3$) of the third and fourth lead portions 23, 27 of the third and fourth internal electrodes 21, 25 in each second internal electrode group 20b is set larger than the width ($W_2$) of the third and fourth lead portions 23, 27 of the third and fourth internal electrodes 21, 25 in each second internal electrode group 20a. Namely, the length of the exposed part of the third and fourth lead portions 23, 27 in the second internal electrode group 20b in the second side face 5 is set longer than the length of the exposed part of the third and fourth lead portions 23, 27 in the second internal electrode group 20a in the second side face 5. The width of each lead portion 13, 17, 23, 27 is a length in the third direction of the lead portion 13, 17, 23, 27.

The first and second end faces 2, 3 face each other in the opposed direction of the first internal electrode 11 and the second internal electrode 15. Therefore, in a state in which the multilayer capacitor C1 is mounted on another component, the first to fourth internal electrodes 11, 15, 21, 25 and the first to fourth intermediate internal electrodes 30-33 extend in a direction perpendicular to a mount surface of the other component (surface on which the multilayer capacitor C1 is mounted).

The first terminal electrode 40 is disposed on the second side face 5 of the capacitor element body 1. The first terminal electrode 40 is formed as extending in the first direction so as to cover all the exposed parts of the first lead portions 13 in the second side face 5 and the exposed parts of the third lead portions 23 in the second side face 5. The first terminal electrode 40 is physically and electrically connected to each of the first and third lead portions 13, 23. This makes all the first and third internal electrodes 11, 21 electrically and physically connected to the first terminal electrode 40.

The second terminal electrode 42 is disposed on the second side face 5 of the capacitor element body 1. The second terminal electrode 42 is formed as extending in the first direction so as to cover all the exposed parts of the second lead portions 17 in the second side face 5 and the exposed parts of the fourth lead portions 27 in the second side face 5. The second terminal electrode 42 is physically and electrically connected to each of the second and fourth lead portions 17, 27. This makes all the second and fourth internal electrodes 15, 25 electrically and physically connected to the second terminal electrode 42.

The first and second terminal electrodes 40, 42 are formed, for example, by applying an electroconductive paste containing an electroconductive metal powder and glass frit, onto the exterior of the capacitor element body 1 and baking it. A plated layer is sometimes formed on the first and second terminal electrodes 40, 42 after baked, according to need. The application of the electroconductive paste can be implemented by dipping, printing, or the like. The first and second terminal electrodes 40, 42 are formed as electrically isolated from each other on the surface of the capacitor element body 1.

In the first embodiment, as described above, one capacitance component is formed in each first internal electrode group 10, two capacitance components are formed in each second internal electrode group 20a, and four capacitance components are formed in each second internal electrode group 20b. The two capacitance components formed in the second internal electrode group 20a are connected in series and the four capacitance components formed in the second internal electrode group 20b are connected in series. Therefore, the total capacitance of the four capacitance components formed in the second internal electrode group 20b is smaller than the total capacitance of the two capacitance components formed in the second internal electrode group 20a, and the total capacitance of the two capacitance components formed in the second internal electrode group 20a is smaller than the capacitance of the capacitance component formed in the first internal electrode group 10.

In general, the self-resonant frequency (fr) of a capacitor is represented by the equation below, where L is the equivalent series inductance of the capacitor and C the capacitance.

$$fr = (2\pi(L*C)^{1/2})^{-1}$$

Hence, the self-resonant frequency of the capacitor can be changed by changing the equivalent series inductance and/or the capacitance of the capacitor. In this instance, the self-resonant frequency becomes higher with decrease in capacitance. The self-resonant frequency becomes higher with decrease in equivalent series inductance.

Figure 7:
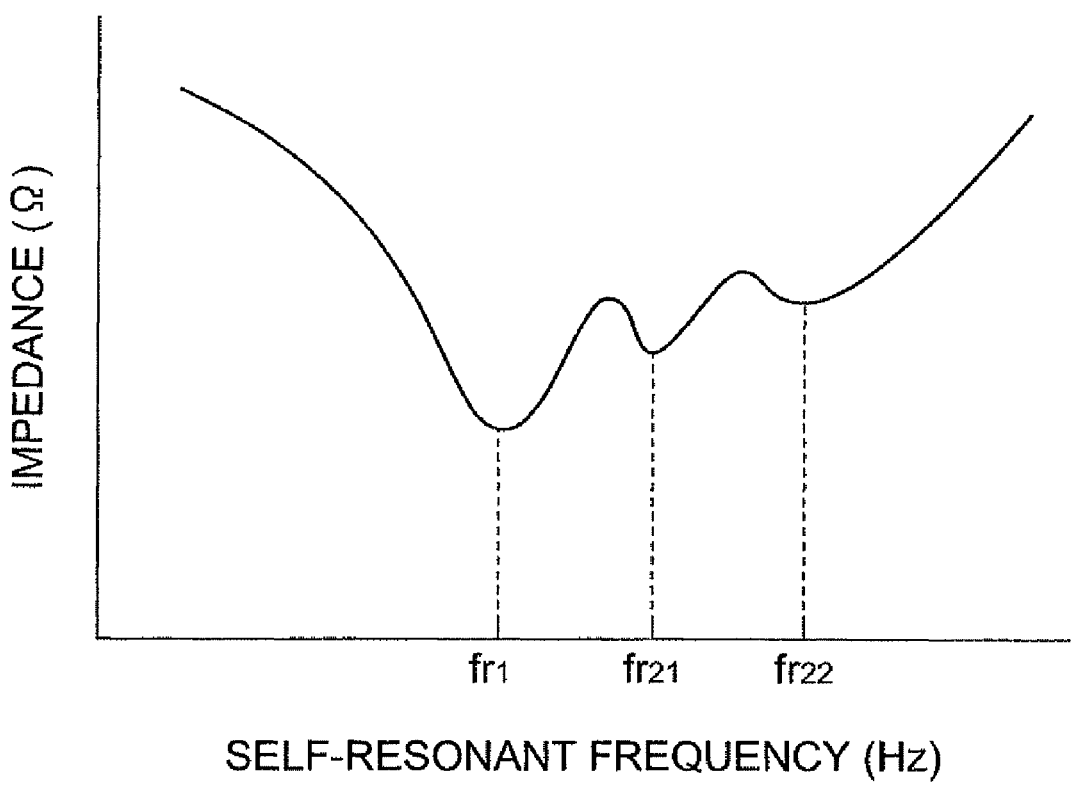
FIG. 7 is a graph showing frequency characteristics of impedance in the multilayer filter of the first embodiment.

In the first embodiment, the relation of $fr_1 < fr_{21} < fr_{22}$ holds among the self-resonant frequency ($fr_1$) due to the one capacitance component in the first internal electrode group 10, the self-resonant frequency ($fr_{21}$) due to the two capacitance components in the second internal electrode group 20a, and the self-resonant frequency ($fr_{22}$) due to the four capacitance components in the second internal electrode group 20b. As a result, as shown in FIG. 7, the reduction of impedance is achieved over a wide frequency band. FIG. 7 is a graph showing the impedance ($\Omega$) characteristics against frequency (Hz) of the multilayer capacitor C1 of the first embodiment. In the graph shown in FIG. 7, the horizontal axis represents frequency (Hz) and the vertical axis impedance ($\Omega$).

Since in the present embodiment the first and second terminal electrodes 40, 42 are disposed on the second side face 5 of the capacitor element body 1, current pathways formed in the multilayer capacitor C1 become relatively short. As a result, it becomes feasible to reduce the equivalent series inductance of the multilayer capacitor C1.

In the present embodiment, the relation of $W_1 < W_2 < W_3$ is set among the width ($W_1$) of the first and second lead portions 13, 17, the width ($W_2$) of the third and fourth lead portions 23, 27 in the second internal electrode group 20a, and the width ($W_3$) of the third and fourth lead portions 23, 27 in the second internal electrode group 20b. This leads to the relation of $L_1 > L_{21} > L_{22}$ among the equivalent series inductance ($L_1$) of the one capacitance component in the first internal electrode group 10, the equivalent series inductance ($L_{21}$) of the two capacitance components in the second internal electrode group 20a, and the equivalent series inductance ($L_{22}$) of the four capacitance components in the second internal electrode group 20b. As a result, it becomes feasible to further reduce the equivalent series inductance of the multilayer capacitor C1.

Incidentally, the equivalent series inductance of the multilayer capacitor C1 can also be reduced by setting the relation of $W_1 > W_2 > W_3$ among the widths ($W_1$, $W_2$, $W_3$) of the lead portions 13, 17, 23, 27. However, when the relation of $W_1 > W_2 > W_3$ holds among the widths ($W_1$, $W_2$, $W_3$) of the lead portions 13, 17, 23, 27, the self-resonant frequencies ($fr_1$, $fr_{21}$, $fr_{22}$) come to have close values, which may inhibit the reduction in impedance over the wide band. Therefore, this relation is not preferred.

Figure 8:
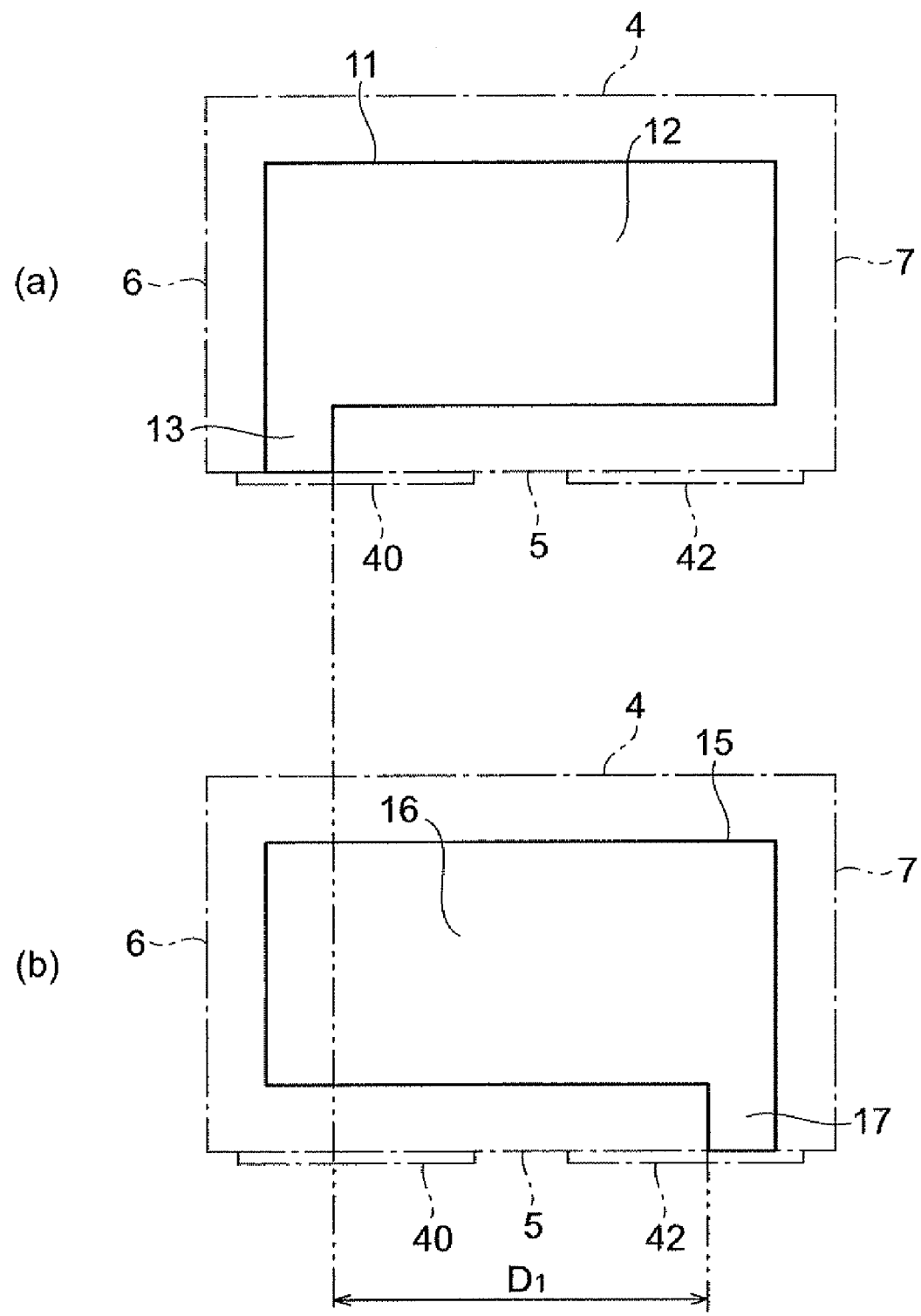
FIG. 8 is a drawing showing configurations of respective internal electrodes in a modification example of the first embodiment.
Figure 9:
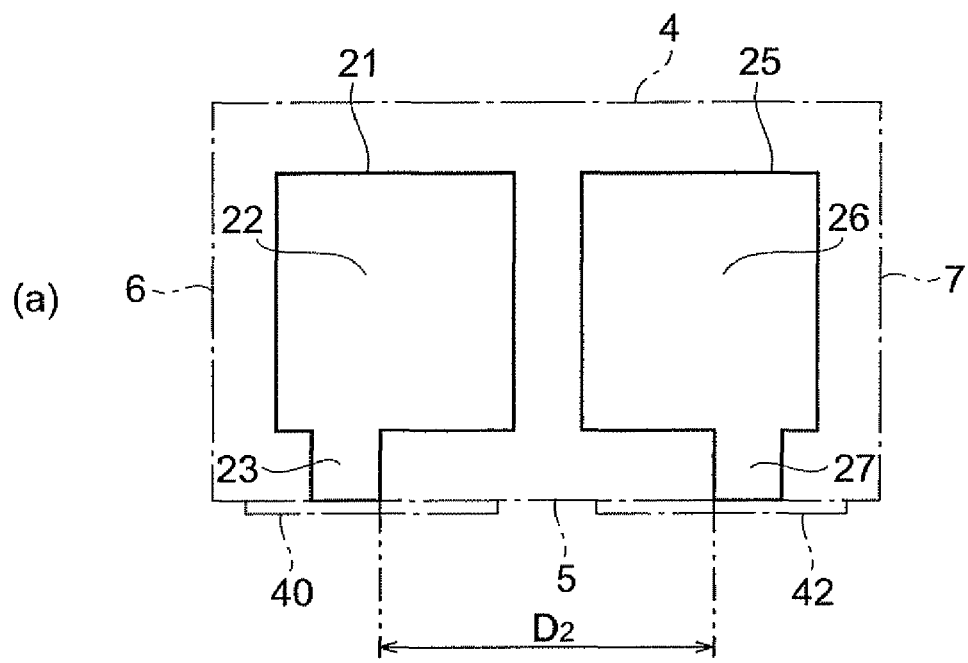
FIG. 9 is a drawing showing configurations of respective internal electrodes in the modification example of the first embodiment.
Figure 9:
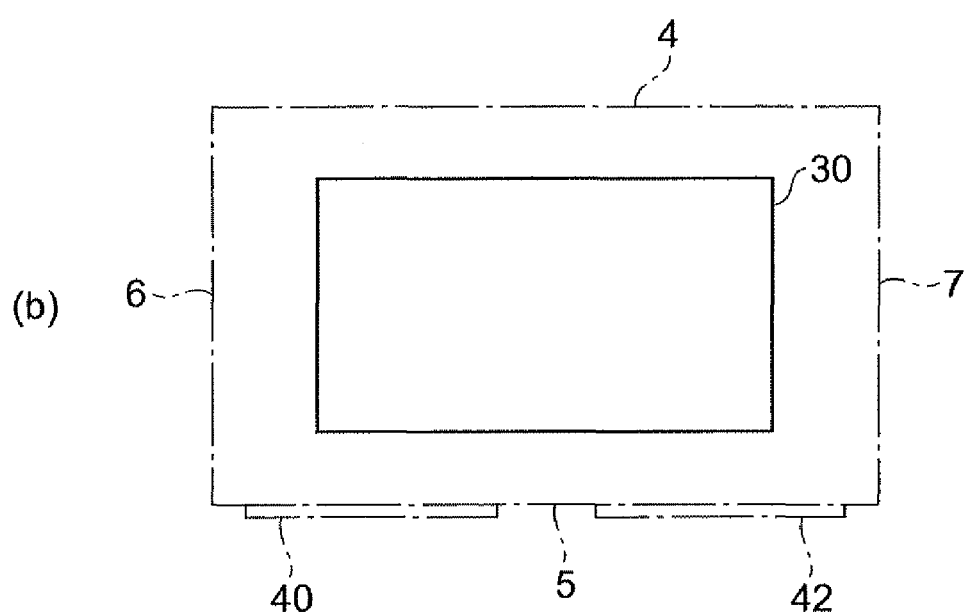
Figure 10:
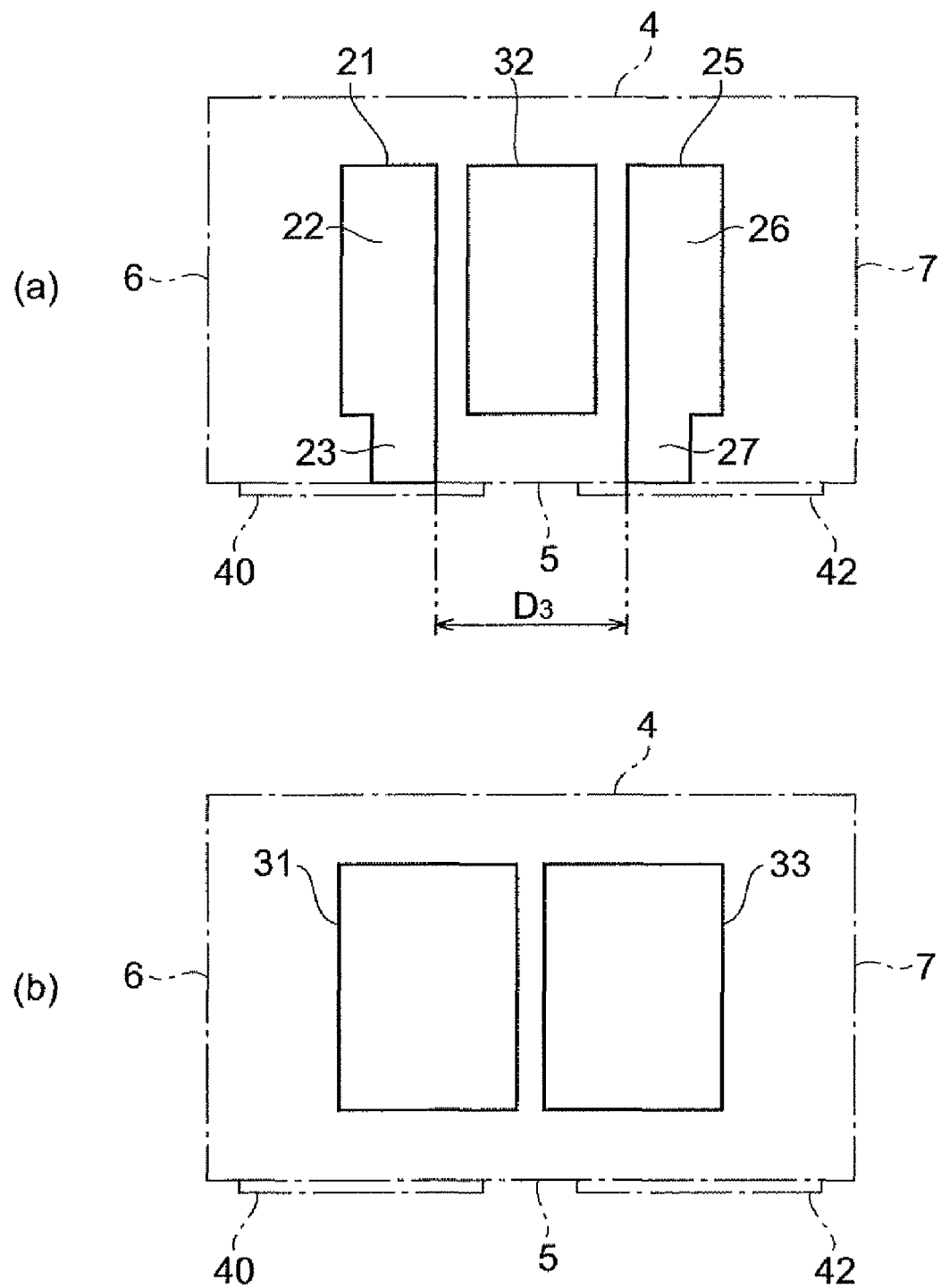
FIG. 10 is a drawing showing configurations of respective internal electrodes in the modification example of the first embodiment.

A modification example of the multilayer capacitor C1 of the first embodiment will be described below on the basis of FIGS. 8 to 10. The multilayer capacitor of the present modification example is different in the shapes of the first to fourth internal electrodes 11, 15, 21, 25 from the multilayer capacitor C1 of the above-described embodiment. In FIGS. 8 to 10 each of (a) and (b) is a view showing a configuration of an internal electrode in the modification example of the first embodiment.

As shown in FIGS. 8 to 10, the relation of $D_1 > D_2 > D_3$ is set among a distance ($D_1$) between the first lead portion 13 and the second lead portion 17, a distance ($D_2$) between the third lead portion 23 and the fourth lead portion 27 in the second internal electrode group 20a, and a distance ($D_3$) between the third lead portion 23 and the fourth lead portion 27 in the second internal electrode group 20b. The distance ($D_1$) between the first lead portion 13 and the second lead portion 17 refers, specifically, to the shortest direct distance between a connection between the first lead portion 13 and the first terminal electrode 40 and a connection between the second lead portion 17 and the second terminal electrode 42. The distances ($D_2$, $D_3$) between the third lead portion 23 and the fourth lead portion 27 refer, specifically, to the shortest direct distances between a connection between the third lead portion 23 and the first terminal electrode 40 and a connection between the fourth lead portion 27 and the second terminal electrode 42.

In the present modification example, there is also the relation of $fr_1 < fr_{21} < fr_{22}$ among the self-resonant frequency ($fr_1$) due to the one capacitance component in the first internal electrode group 10, the self-resonant frequency ($fr_{21}$) due to the two capacitance components in the second internal electrode group 20a, and the self-resonant frequency ($fr_{22}$) due to the four capacitance components in the second internal electrode group 20b. As a result, the reduction of impedance is achieved over a wide frequency band.

There is the relation of $L_1 > L_{21} > L_{22}$ among the equivalent series inductance ($L_1$) of the one capacitance component in the first internal electrode group 10, the equivalent series inductance ($L_{21}$) of the two capacitance components in the second internal electrode group 20a, and the equivalent series inductance ($L_{22}$) of the four capacitance components in the second internal electrode group 20b. As a result, it becomes feasible to further reduce the equivalent series inductance of the multilayer capacitor C1.

Incidentally, the equivalent series inductance of the multilayer capacitor C1 can also be reduced by setting the relation of $D_1 < D_2 < D_3$ among the distances ($D_1$, $D_2$, $D_3$) between the lead portions 13, 17, 23, 27. However, when the relation of $D_1 < D_2 < D_3$ holds among the distances ($D_1$, $D_2$, $D_3$) between the lead portions 13, 17, 23, 27, the self-resonant frequencies ($fr_1$, $fr_{21}$, $fr_{22}$) come to have close values, which may inhibit the reduction of impedance over the wide band. Therefore, this relation is not preferred.

Second Embodiment

Figure 11:
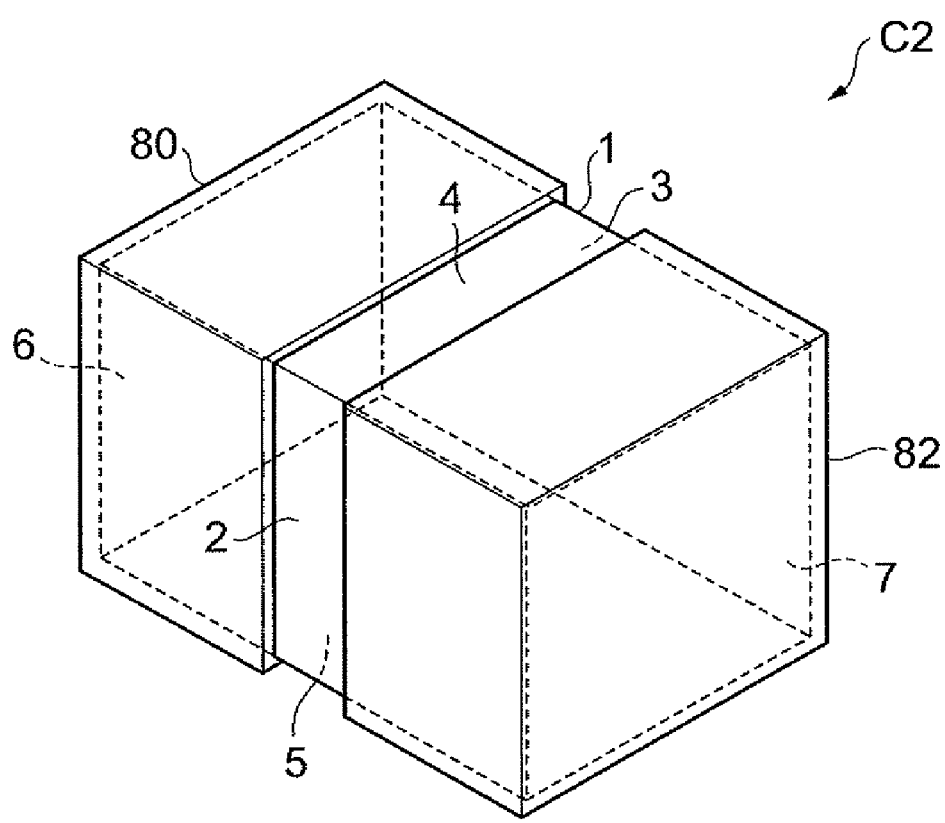
FIG. 11 is a schematic perspective view showing a multilayer capacitor according to the second embodiment.
Figure 12:
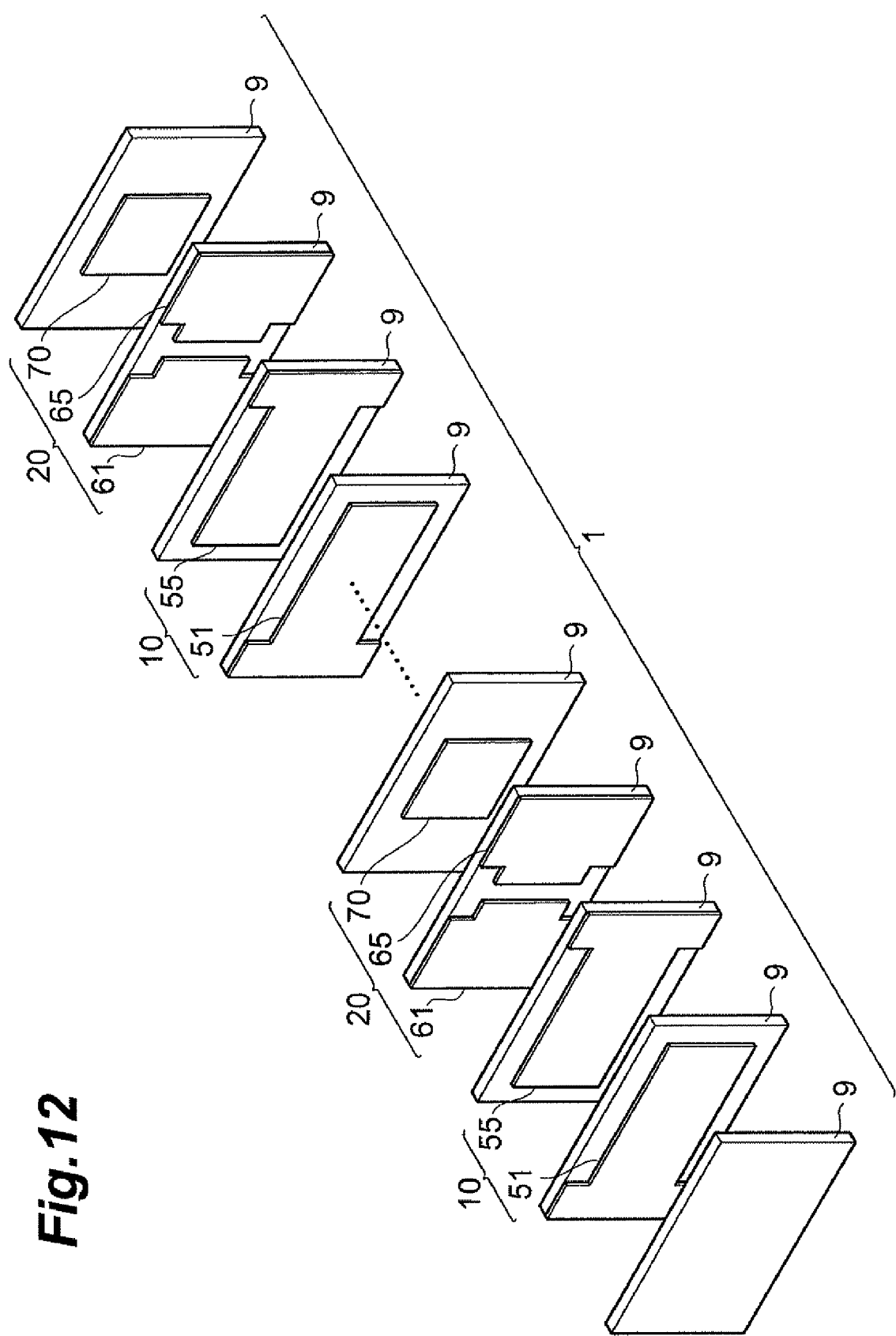
FIG. 12 is an exploded perspective view of a capacitor element body in the multilayer capacitor according to the second embodiment.
Figure 13:
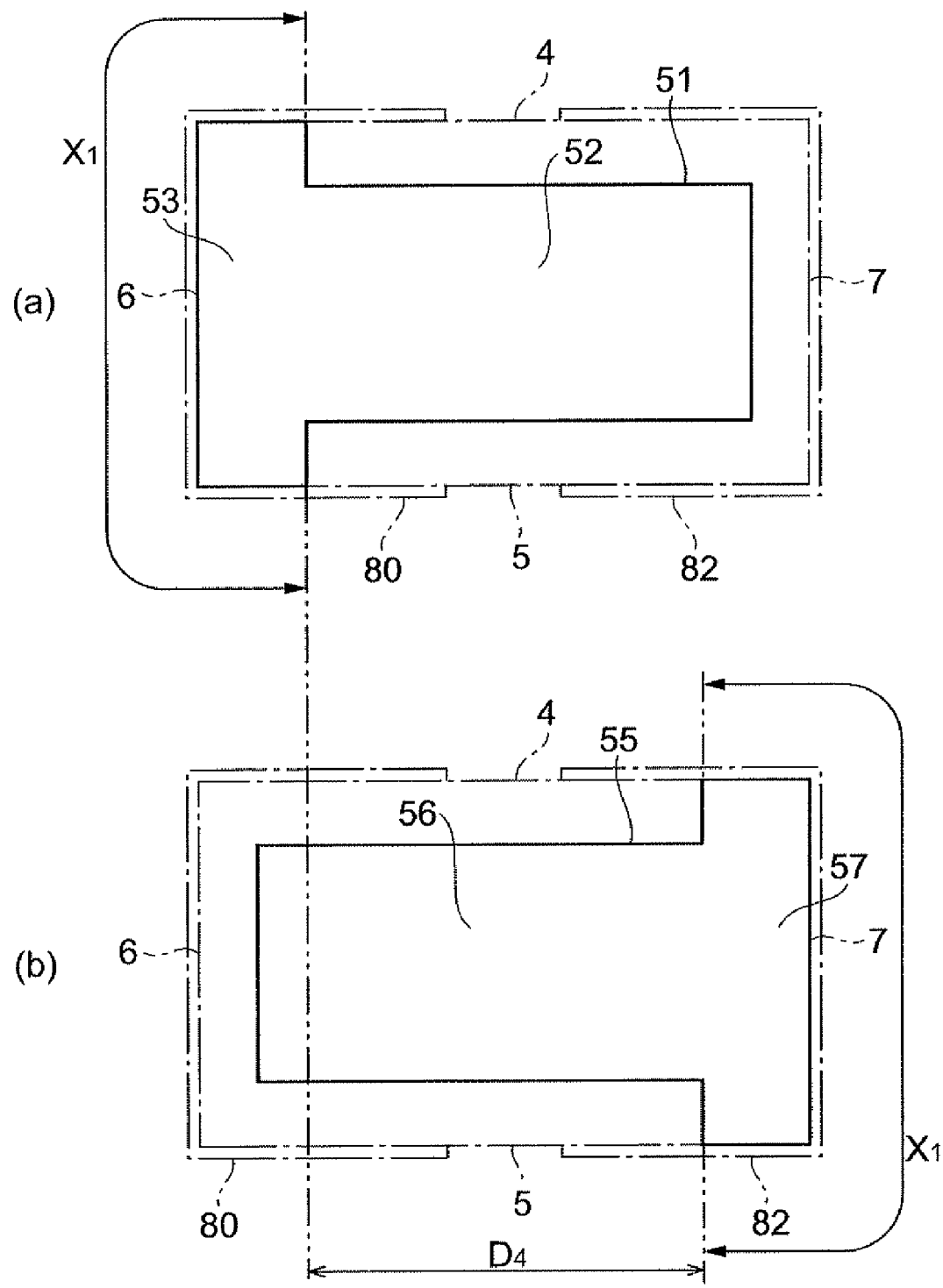
FIG. 13 is a drawing showing configurations of internal electrodes.
Figure 14:
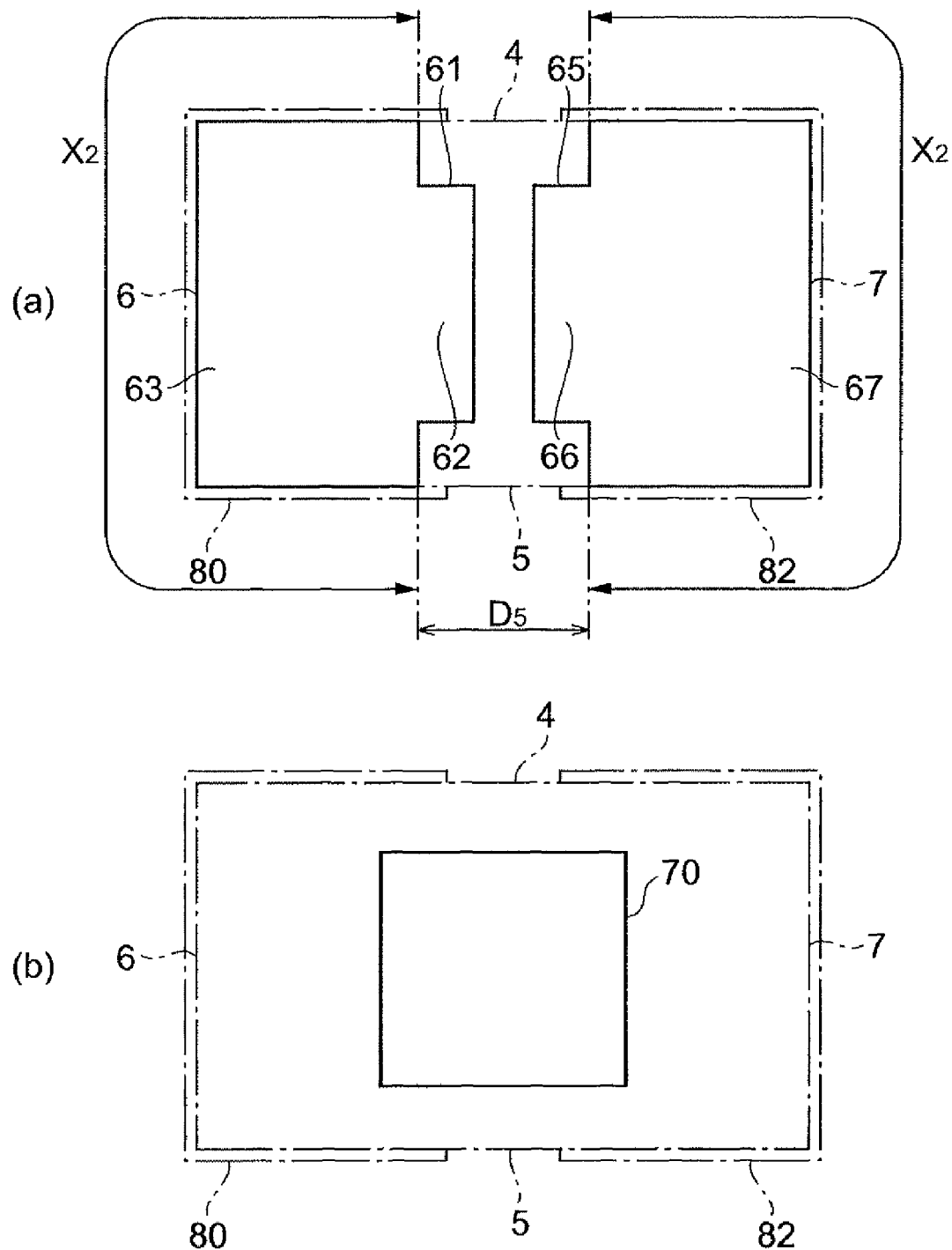
FIG. 14 is a drawing showing configurations of internal electrodes.

A configuration of a multilayer capacitor C2 according to the second embodiment will be described with reference to FIGS. 11 to 14. FIG. 11 is a schematic perspective view showing the multilayer capacitor according to the second embodiment. FIG. 12 is an exploded perspective view of a capacitor element body in the multilayer capacitor of the second embodiment. In FIGS. 13 and 14 each of (a) and (b) is a view showing a configuration of an internal electrode.

The multilayer capacitor C2, as shown in FIG. 11, is provided with a capacitor element body 1 of a nearly rectangular parallelepiped shape, a first terminal electrode 80, and a second terminal electrode 82. In the present embodiment the second side face 5 is also a mounted surface to be opposed to another component (e.g., a circuit board, an electronic component, or the like).

The multilayer capacitor C2, as shown in FIG. 12, is provided with a plurality of first internal electrode groups 10 and a plurality of second internal electrode groups 20. Each first internal electrode group 10 has a first internal electrode 51 and a second internal electrode 55. Each second internal electrode group 20 has a third internal electrode 61, a fourth internal electrode 65, and a first intermediate internal electrode 70. The internal electrodes 51, 55, 61, 65, 70 are located inside the capacitor element body 1. Each internal electrode 51, 55, 61, 65, 70 is made of an electrically conductive material (e.g., a base metal Ni or the like) usually used as internal electrodes in a multilayer electric element. Each internal electrode 51, 55, 61, 65, 70 is constructed as a sintered body of an electroconductive paste containing the aforementioned electrically conductive material.

Each first internal electrode 51, as shown in FIG. 13(*a*), has a main electrode portion 52 of a rectangular shape, and a first lead portion 53 extending from the main electrode portion 52 so that an end thereof is exposed in the first to third side faces 4, 5, 6. The main electrode portion 52 and the first lead portion 53 are integrally formed. The first lead portion 53 extends from an end of the main electrode portion 52 near the third side face 6, to the first to third side faces 4, 5, 6.

Each second internal electrode 55, as shown in FIG. 13(*b*), has a main electrode portion 56 of a rectangular shape, and a second lead portion 57 extending from the main electrode portion 56 so that an end thereof is exposed in the first, second, and fourth side faces 4, 5, 7. The main electrode portion 56 and the second lead portion 57 are integrally formed. The second lead portion 57 extends from an end of the main electrode portion 56 near the fourth side face 7, to the first, second, and fourth side faces 4, 5, 7.

The main electrode portion 52 of the first internal electrode 51 and the main electrode portion 56 of the second internal electrode 55 are opposed to each other with the insulator layer 9 in between. An overlap of the insulator layer 9 with the main electrode portion 52 of the first internal electrode 51 and the main electrode portion 56 of the second internal electrode 55 is a region that substantially produces one capacitance component. Namely, the first internal electrode 51 and the second internal electrode 55 are arranged with the insulator layer 9 in between so as to form one capacitance component between the first and second internal electrodes 51, 55.

Each third internal electrode 61, as shown in FIG. 14(*a*), has a main electrode portion 62 of a rectangular shape, and a third lead portion 63 extending from the main electrode portion 62 so that an end thereof is exposed in the first to third side faces 4, 5, 6. The main electrode portion 62 and the third lead portion 63 are integrally formed. The third lead portion 63 extends from an end of the main electrode portion 62 near the third side face 6, to the first to third side faces 4, 5, 6. The area of the main electrode portion 62 is smaller than the area of the main electrode portions 52, 56.

Each fourth internal electrode 65, as shown in FIG. 14(*a*), has a main electrode portion 66 of a rectangular shape, and a fourth lead portion 67 extending from the main electrode portion 66 so that an end thereof is exposed in the first, second, and fourth side faces 4, 5, 7. The main electrode portion 66 and the fourth lead portion 67 are integrally formed. The fourth lead portion 67 extends from an end of the main electrode portion 66 near the fourth side face 7, to the first, second, and fourth side faces 4, 5, 7. The third internal electrode 61 and the fourth internal electrode 65 are located in an identical layer. The area of the main electrode portion 66 is smaller than the area of the main electrode portions 52, 56.

The first intermediate internal electrode 70 is located in a layer different from that of the third and fourth internal electrodes 61, 65. Namely, the first intermediate internal electrode 70 is opposed to the third and fourth internal electrodes 61, 65 (main electrode portions 62, 66) with the insulator layer 9 in between.

An overlap of the insulator layer 9 with the main electrode portion 62 of the third internal electrode 61 and the first intermediate internal electrode 70 is a region that substantially produces one capacitance component. An overlap of the insulator layer 9 with the main electrode portion 66 of the fourth internal electrode 65 and the first intermediate internal electrode 70 is a region that substantially produces one capacitance component. Namely, the third and fourth internal electrodes 61, 65 and the first intermediate internal electrode 70 are arranged with the insulator layer 9 in between so as to form the two capacitance components between the third and fourth internal electrodes 61, 65. The two capacitance components formed between the third and fourth internal electrodes 61, 65 are connected in series.

The first and third lead portions 53, 63 are exposed in a region of the first to third side faces 4, 5, 6 and the second and fourth lead portions 57, 67 are exposed in a region of the first, second, and fourth side faces 4, 5, 7. A length ($X_2$) of the exposed part of the third and fourth lead portions 63, 67 in the exterior of the capacitor element body 1 is set longer than a length ($X_1$) of the exposed part of the first and second lead portions 53, 57 in the exterior of the capacitor element body 1. The length ($X_1$, $X_2$) of the exposed part of each lead portion 53, 57, 63, 67 in the exterior of the capacitor element body 1 corresponds to the width of each lead portion 53, 57, 63, 67.

In the multilayer capacitor C2, similarly as in the multilayer capacitor C1, the first to fourth internal electrodes 51, 55, 61, 65 and the first intermediate internal electrode 70 also extend in a direction perpendicular to a mount surface of another component (surface on which the multilayer capacitor C2 is mounted) in a state in which the multilayer capacitor C2 is mounted on the other component.

The first terminal electrode 80 is disposed so as to cover the entire third side face 6 of the capacitor element body 1 and partially cover the four faces 2, 3, 4, 5 adjacent to the third side face 6. The first terminal electrode 80 is formed so as to cover all the exposed parts of the first and third lead portions 53, 63 in the first to third side faces 4, 5, 6. The first terminal electrode 80 is physically and electrically connected to each of the first and third lead portions 53, 63. This makes all the first and third internal electrodes 51, 61 electrically and physically connected to the first terminal electrode 80.

The second terminal electrode 82 is disposed so as to cover the entire fourth side face 7 of the capacitor element body 1 and partially cover the four faces 2, 3, 4, 5 adjacent to the fourth side face 7. The second terminal electrode 82 is formed so as to cover all the exposed parts of the second and fourth lead portions 57, 67 in the first, second, and fourth side faces 4, 5, 7. The second terminal electrode 82 is physically and electrically connected to each of the second and fourth lead portions 57, 67. This makes all the second and fourth internal electrodes 55, 65 electrically and physically connected to the second terminal electrode 82.

The first and second terminal electrodes 80, 82 are formed, for example, by applying an electroconductive paste containing an electroconductive metal powder and glass frit, onto the exterior of the capacitor element body 1 and baking it. A plated layer is sometimes formed on the first and second terminal electrodes 80, 82 after baked, according to need. The application of the electroconductive paste can be implemented by dipping, printing, or the like. The first and second terminal electrodes 80, 82 are formed as electrically isolated from each other on the surface of the capacitor element body 1.

In the second embodiment, as described above, one capacitance component is formed in each first internal electrode group 10 and two capacitance components are formed in each second internal electrode group 20. The two capacitance components formed in the second internal electrode group 20 are connected in series. Therefore, the total capacitance of the two capacitance components formed in the second internal electrode group 20 is smaller than the capacitance of the capacitance component formed in the first internal electrode group 10.

Figure 15:
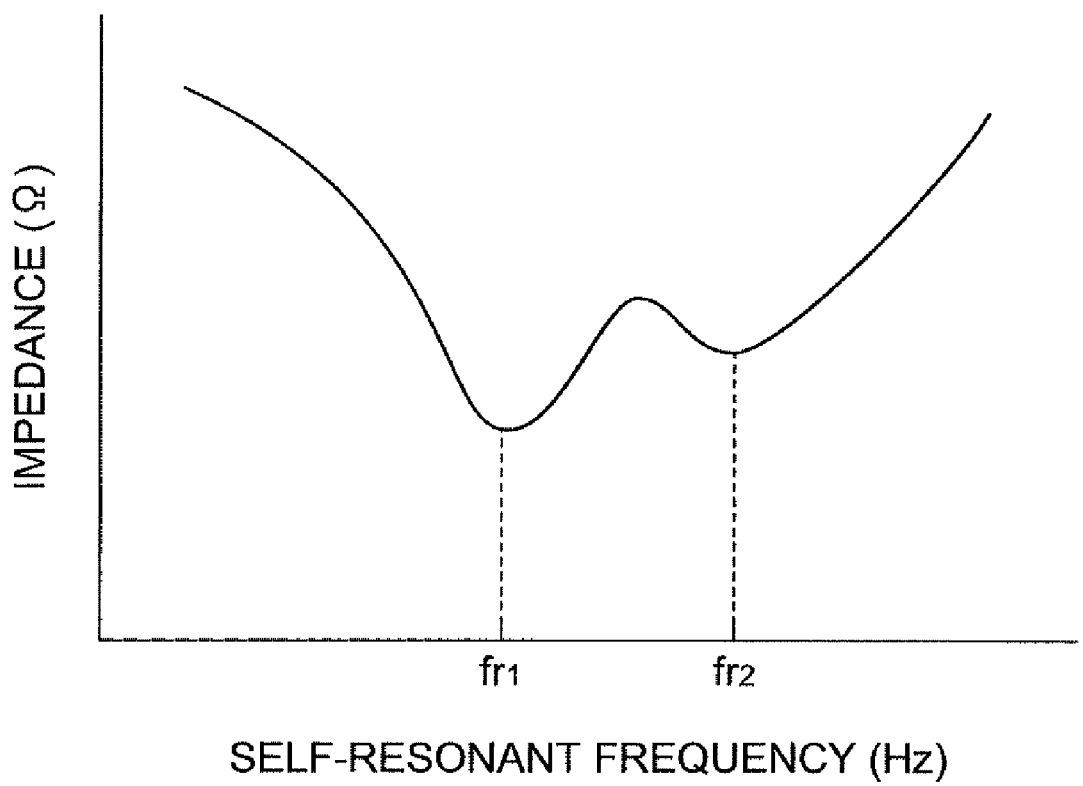
FIG. 15 is a graph showing frequency characteristics of impedance in the multilayer filter of the second embodiment.

In the second embodiment there is the relation of $fr_1 < fr_2$ between the self-resonant frequency ($fr_1$) due to the one capacitance component in the first internal electrode group 10 and the self-resonant frequency ($fr_2$) due to the two capacitance components in the second internal electrode group 20, whereby the reduction of impedance is achieved over a wide frequency band, as shown in FIG. 15. FIG. 15 is a graph showing the impedance (Ω) characteristics against frequency (Hz) of the multilayer capacitor C2 of the second embodiment. In the graph shown in FIG. 15, the horizontal axis represents frequency (Hz) and the vertical axis impedance (Ω).

Since in the present embodiment a part of the first and second terminal electrodes 80, 82 is disposed on the second side face 5 of the capacitor element body 1, current pathways established in the multilayer capacitor C2 are relatively short. As a result, it becomes feasible to reduce the equivalent series inductance of the multilayer capacitor C2.

The relation of $X_1 < X_2$ is set between the length ($X_1$) of the exposed part of the first and second lead portions 53, 57 in the exterior of the capacitor element body 1 and the length ($X_2$) of the exposed part of the third and fourth lead portions 63, 67 in the exterior of the capacitor element body 1. This leads to the relation of $L_1 > L_2$ between the equivalent series inductance ($L_1$) of the one capacitance component in the first internal electrode group 10 and the equivalent series inductance ($L_2$) of the two capacitance components in the second internal electrode group 20, whereby it becomes feasible to further reduce the equivalent series inductance of the multilayer capacitor C2.

Incidentally, in the second embodiment the relation of $D_4 > D_5$ is set between a distance ($D_4$) between the first lead portion 53 and the second lead portion 57 and a distance ($D_5$) between the third lead portion 63 and the fourth lead portion 67, as shown in FIGS. 13 and 14. The distance ($D_4$) between the first lead portion 53 and the second lead portion 57 refers, specifically, to the shortest direct distance between a connection between the first lead portion 53 and the first terminal electrode 80 and a connection between the second lead portion 57 and the second terminal electrode 82. The distance ($D_5$) between the third lead portion 63 and the fourth lead portion 67 refers, specifically, to the shortest direct distance between a connection between the third lead portion 63 and the first terminal electrode 80 and a connection between the fourth lead portion 67 and the second terminal electrode 82.

This leads to the relation of $L_1 > L_2$ between the equivalent series inductance ($L_1$) of the one capacitance component in the first internal electrode group 10 and the equivalent series inductance ($L_2$) of the two capacitance components in the second internal electrode group 20. As a result, it becomes feasible to further reduce the equivalent series inductance of the multilayer capacitor C2.

Modification examples of the multilayer capacitor C2 of the second embodiment will be described below on the basis of FIGS. 16 to 19. The multilayer capacitors of the modification examples are different in the shapes of the first to fourth internal electrodes 51, 55, 61, 65 and the first intermediate internal electrode 70 from the multilayer capacitor C2 of the above-described embodiment. In FIGS. 16 to 19 each of (a) and (b) is a view showing a configuration of an internal electrode.

Figure 16:
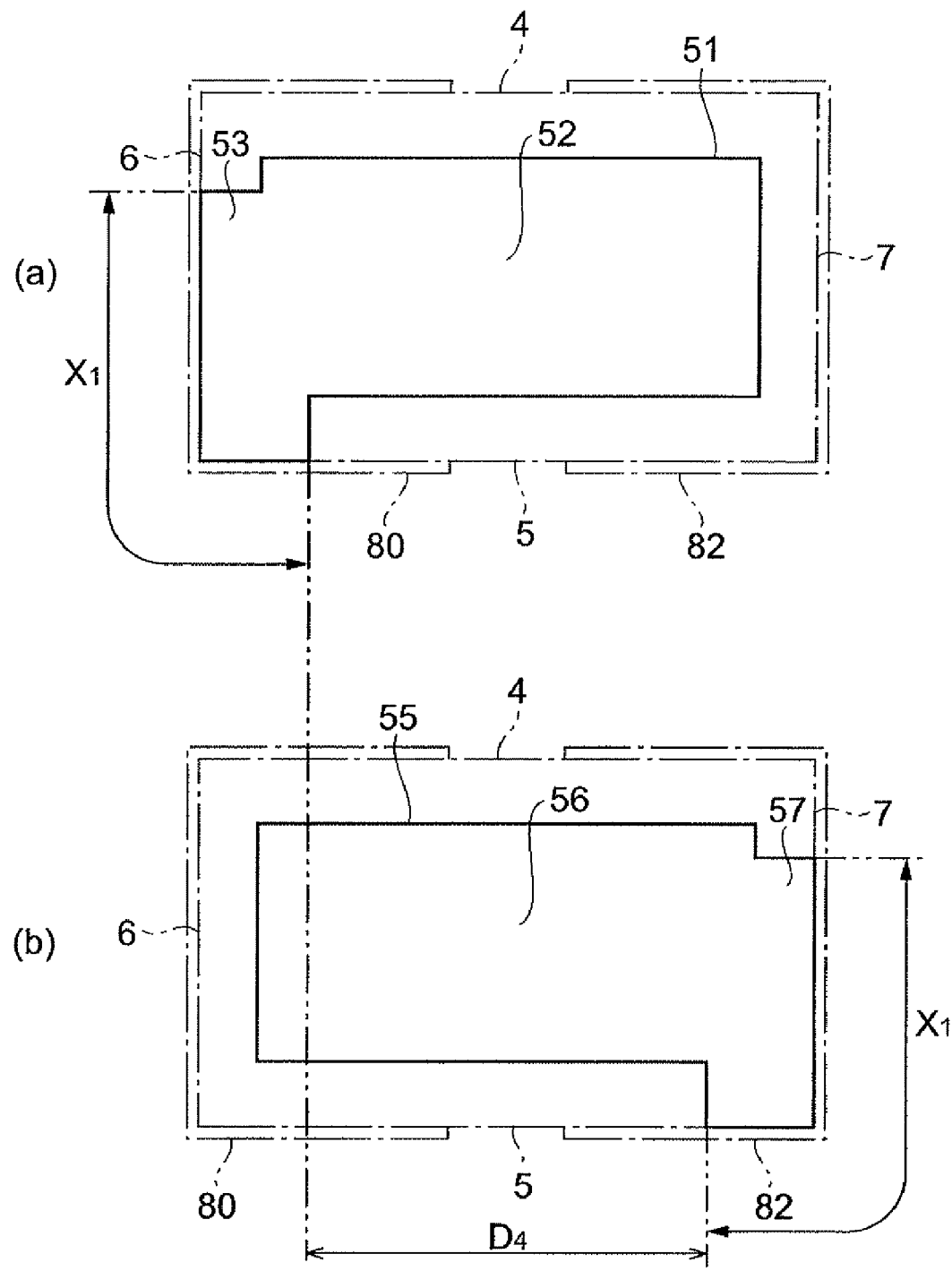
FIG. 16 is a drawing showing configurations of respective internal electrodes in a modification example of the second embodiment.
Figure 17:
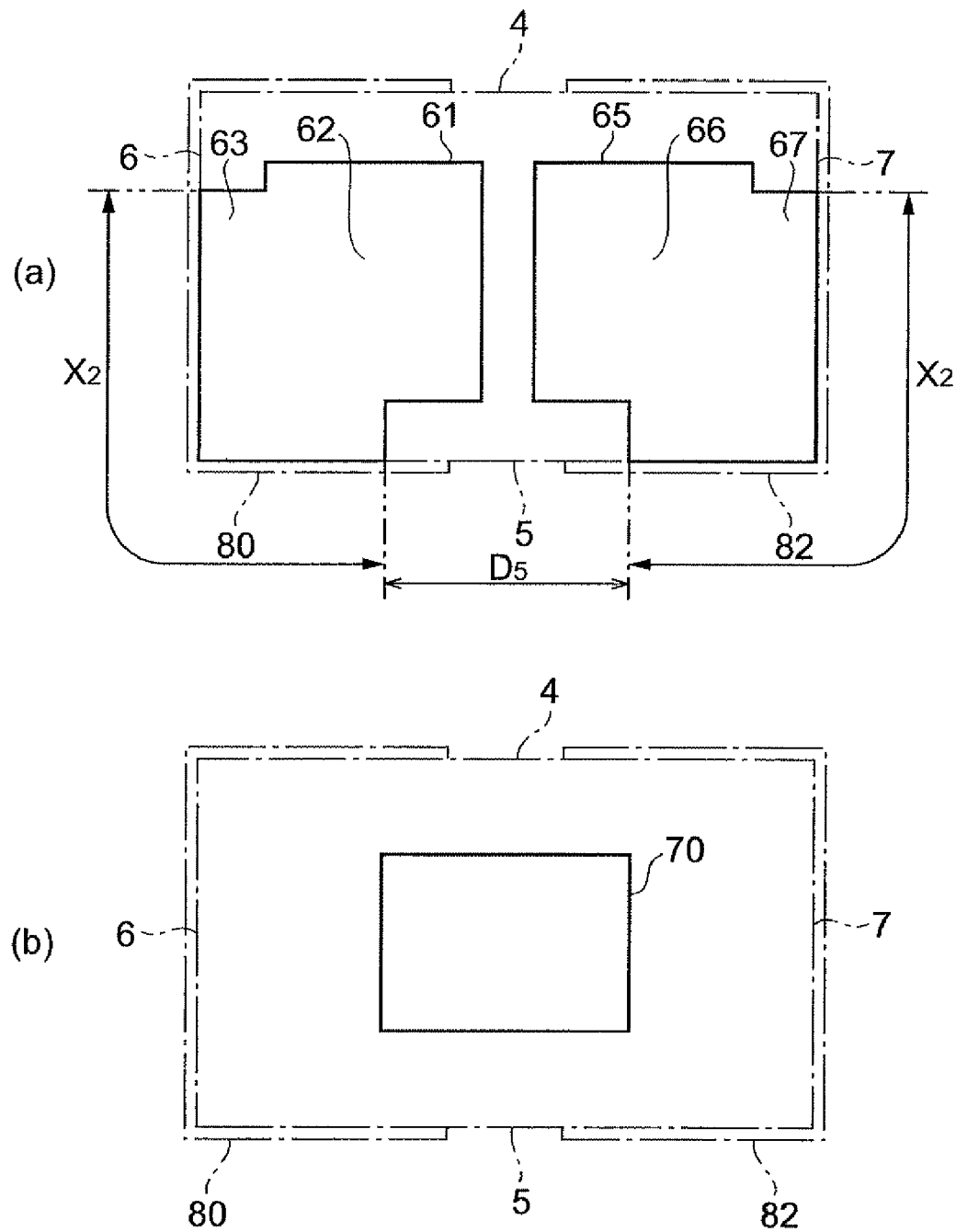
FIG. 17 is a drawing showing configurations of respective internal electrodes in the modification example of the second embodiment.

First, the configurations of the modification example shown in FIGS. 16 and 17 will be described. As shown in FIG. 16, the first lead portion 53 is exposed in a partial region of the first and third side faces 4, 6 and the second lead portions 57 is exposed in a partial region of the second and fourth side faces 5, 7. As shown in FIG. 17, the third lead portion 63 is exposed in a partial region of the second and third side faces 5, 6 and the fourth lead portion 67 is exposed in a partial region of the second and fourth side faces 5, 7. The relation of $X_1 < X_2$ is set between the length ($X_1$) of the exposed part of the first and second lead portions 53, 57 in the exterior of the capacitor element body 1 and the length ($X_2$) of the exposed part of the third and fourth lead portions 63, 67 in the exterior of the capacitor element body 1.

The relation of $D_4 > D_5$ is set between the distance ($D_4$) between the first lead portion 53 and the second lead portion 57 and the distance ($D_5$) between the third lead portion 63 and the fourth lead portion 67.

In the present modification example shown in FIGS. 16 and 17, there is also the relation of $fr_1 < fr_2$ between the self-resonant frequency ($fr_1$) due to the one capacitance component in the first internal electrode group 10 and the self-resonant frequency ($fr_2$) due to the two capacitance components in the second internal electrode group 20. As a result, the reduction of impedance can be achieved over a wide frequency band and it becomes feasible to further reduce the equivalent series inductance.

The configurations of another modification example shown in FIGS. 18 and 19 will be described below. The second internal electrode group 20, as shown in FIG. 19, has first intermediate internal electrodes 70a, 70b. The first intermediate internal electrodes 70a, 70b are located in an identical layer but layer different from that of the third and fourth internal electrodes 61, 65. Namely, the first intermediate internal electrodes 70a, 70b are opposed to the third and fourth internal electrodes 61, 65 (main electrode portions 62, 66) with the insulator layer 9 in between.

An overlap of the insulator layer 9 with the main electrode portion 62 of the third internal electrode 61 and the first intermediate internal electrode 70a is a region that substantially produces one capacitance component. An overlap of the insulator layer 9 with the main electrode portion 66 of the fourth internal electrode 65 and the first intermediate internal electrode 70a is a region that substantially produces one capacitance component. Namely, the third and fourth internal electrodes 61, 65 and the first intermediate internal electrode 70a are arranged with the insulator layer 9 in between so as to form two capacitance components between the third and fourth internal electrodes 61, 65. The two capacitance components are connected in series.

An overlap of the insulator layer 9 with the main electrode portion 62 of the third internal electrode 61 and the first intermediate internal electrode 70b is a region that substantially produces one capacitance component. An overlap of the insulator layer 9 with the main electrode portion 66 of the fourth internal electrode 65 and the first intermediate internal electrode 70b is a region that substantially produces one capacitance component. Namely, the third and fourth internal electrodes 61, 65 and the first intermediate internal electrode 70b are also arranged with the insulator layer 9 in between so as to form two capacitance components between the third and fourth internal electrodes 61, 65. The two capacitance components are connected in series.

The two capacitance components connected in series by the first intermediate internal electrode 70a and the two capacitance components connected in series by the first intermediate internal electrode 70b are connected in parallel.

Figure 18:
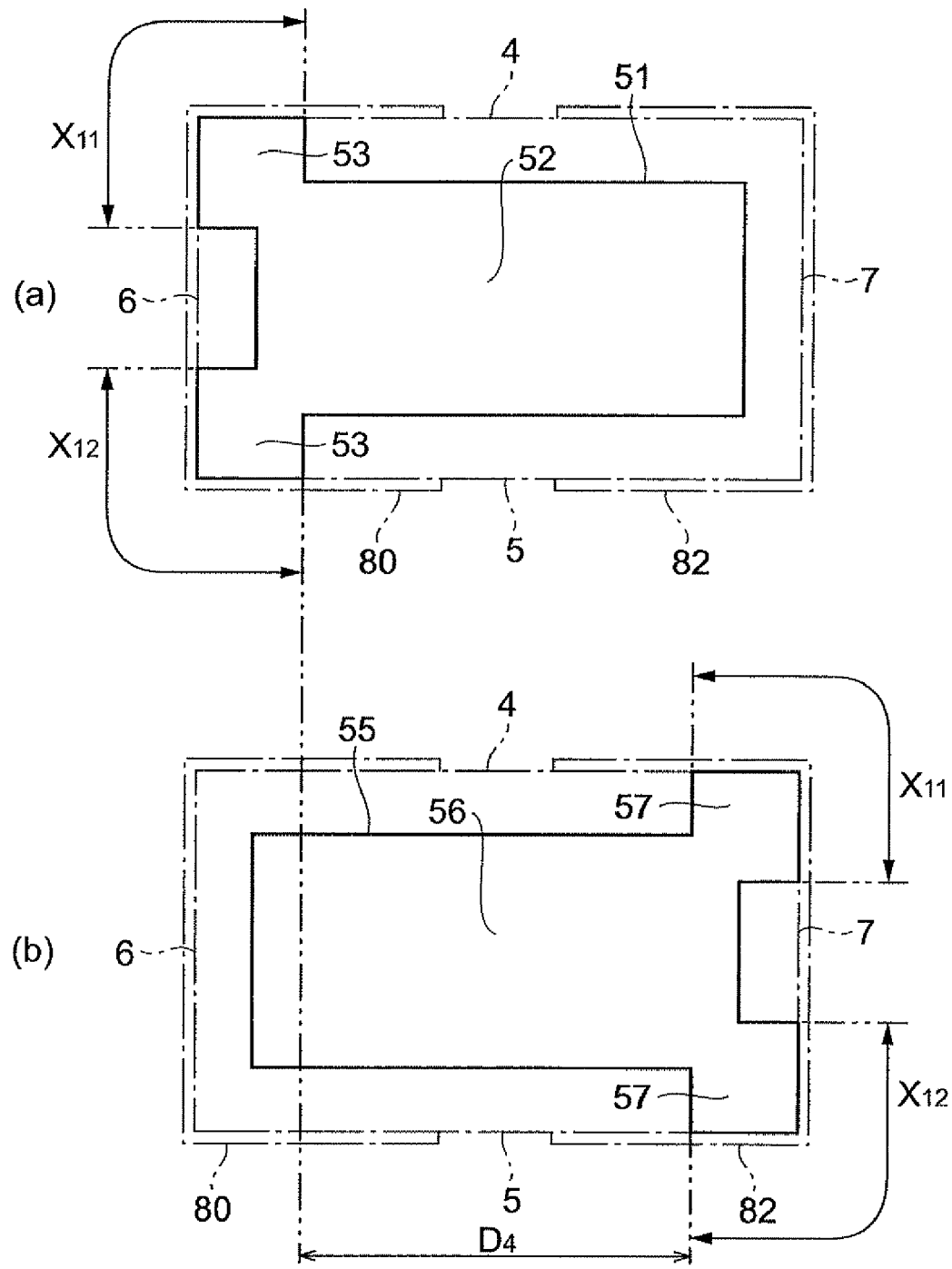
FIG. 18 is a drawing showing configurations of respective internal electrodes in another modification example of the second embodiment.
Figure 19:
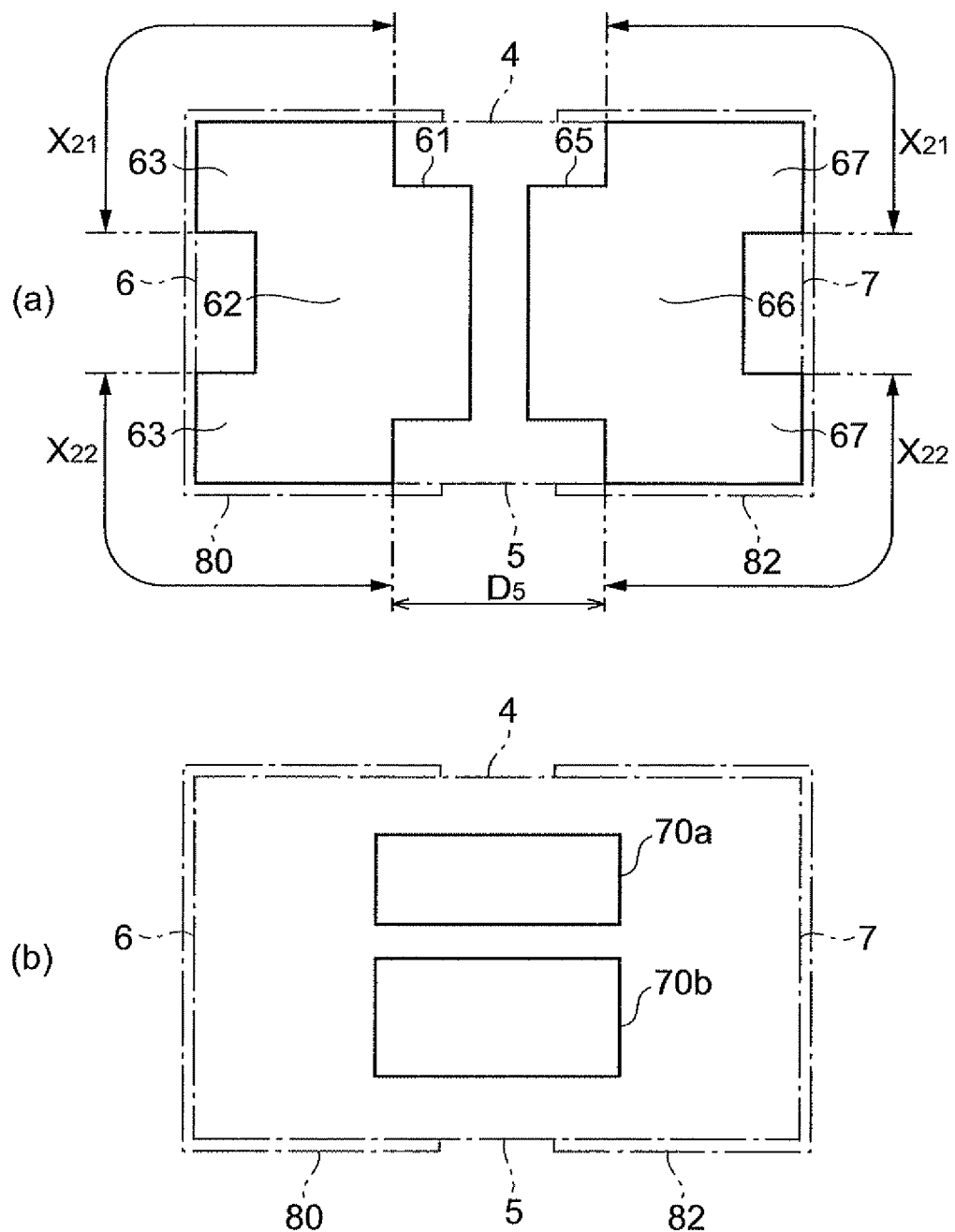
FIG. 19 is a drawing showing configurations of respective internal electrodes in the modification example of the second embodiment.

As shown in FIG. 18, the first lead portion 53 is exposed in a partial region of the first and third side faces 4, 6 and in a partial region of the second and third side faces 5, 6. The second lead portion 57 is exposed in a partial region of the first and fourth side faces 4, 7 and in a partial region of the second and fourth side faces 5, 7. As shown in FIG. 19, the third lead portion 63 is exposed in a partial region of the first and third side faces 4, 6 and in a partial region of the second and third side faces 5, 6. The fourth lead portion 67 is exposed in a partial region of the first and fourth side faces 4, 7 and in a partial region of the second and fourth side faces 5, 7. The relation of $X_{11}+X_{12}<X_{21}+X_{22}$ is set between the length ($X_{11}+X_{12}$) of the exposed part of the first and second lead portions 53, 57 in the exterior of the capacitor element body 1 and the length ($X_{21}+X_{22}$) of the exposed part of the third and fourth lead portions 63, 67 in the exterior of the capacitor element body 1.

The relation of $D_4>D_5$ is set between the distance ($D_4$) between the first lead portion 53 and the second lead portion 57 and the distance ($D_5$) between the third lead portion 63 and the fourth lead portion 67.

In the present modification example shown in FIGS. 18 and 19, the relation of $fr_1<fr_2$ also holds between the self-resonant frequency ($fr_1$) due to the one capacitance component in the first internal electrode group 10 and the self-resonant frequency ($fr_2$) due to the two capacitance components in the second internal electrode group 20. As a result, the reduction of impedance is achieved over a wide frequency band and it is feasible to further reduce the equivalent series inductance.

The above described the preferred embodiments of the present invention, but it is noted that the present invention is not always limited to the above-described embodiments but can be modified in many ways without departing from the scope of the invention.

The numbers and locations of the first and second internal electrode groups are not limited to those in the embodiments and modification examples. The number of laminated insulator layers 9 in the capacitor element body 1 and the number of laminated internal electrodes 11, 15, 21, 25, 30-33, 51, 55, 61, 65, 70, 70a, 70b are not limited to the numbers described in the above-described embodiments and modification examples. The shapes of the respective internal electrodes 11, 15, 21, 25, 30-33, 51, 55, 61, 65, 70, 70a, 70b are not limited to those in the above-described embodiments and modification examples, either.

The number of types of second internal electrode groups 20 is not limited to the number (one or two) described in the above embodiments and modification examples, but may be three or more. The number of capacitance components connected in series in each second internal electrode group 20 is not limited to the number (two or four) described in the above embodiments and modification examples, either, and the number may be three or five or more. In the second embodiment the two capacitance components are connected in series in each second internal electrode group 20, but, without having to be limited to this, four capacitance components may be connected in series as in the second internal electrode group 20b of the first embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor element body in which a plurality of insulator layers are laminated;
   first and second terminal electrodes disposed on an external surface extending in a direction parallel to a laminating direction of the insulator layers, among external surfaces of the capacitor element body;
   a first internal electrode group comprising a first internal electrode connected to the first terminal electrode, and a second internal electrode connected to the second terminal electrode; and
   a second internal electrode group comprising a third internal electrode connected to the first terminal electrode, a fourth internal electrode connected to the second terminal electrode, and at least one intermediate internal electrode not connected to the first and second terminal electrodes;
   wherein the first and second internal electrodes are arranged with the insulator layer in between so as to form a capacitance component between the first and second internal electrodes; and
   wherein the third and fourth internal electrodes and the intermediate internal electrode are arranged with the insulator layer in between so as to form two or more capacitance components between the third and fourth internal electrodes,
   wherein the first internal electrode has a first lead portion connected to the first terminal electrode,
   wherein the second internal electrode has a second lead portion connected to the second terminal electrode,
   wherein the third internal electrode has a third lead portion connected to the first terminal electrode,
   wherein the fourth internal electrode has a fourth lead portion connected to the second terminal electrode, and
   wherein a width of the third and fourth lead portions is larger than a width of the first and second lead portions.

2. The multilayer capacitor according to claim 1, wherein the second internal electrode group comprises a first intermediate internal electrode opposed to the third and fourth internal electrodes, as said at least one intermediate internal electrode.

3. The multilayer capacitor according to claim 2, wherein the at least one intermediate internal electrode of the second internal electrode group further comprises second to fourth intermediate internal electrodes,
   wherein the second intermediate internal electrode is opposed to the third internal electrode and the third intermediate internal electrode, and
   wherein the fourth intermediate internal electrode is opposed to the fourth internal electrode and the third intermediate internal electrode.

4. The multilayer capacitor according to claim 1, wherein the second internal electrode group comprises second to fourth intermediate internal electrodes as said at least one intermediate internal electrode,
   wherein the second intermediate internal electrode is opposed to the third internal electrode and the third intermediate internal electrode, and
   wherein the fourth intermediate internal electrode is opposed to the fourth internal electrode and the third intermediate internal electrode.

5. The multilayer capacitor according to claim 1, wherein the second internal electrode group includes two types of internal electrode groups, an internal electrode group having a first intermediate internal electrode and an internal electrode group having second to fourth intermediate internal electrodes,
   wherein the first intermediate internal electrode is opposed to the third and fourth internal electrodes,
   wherein the second intermediate internal electrode is opposed to the third internal electrode and the third intermediate internal electrode, and wherein the fourth intermediate internal electrode is opposed to the fourth internal electrode and the third intermediate internal electrode.

6. The multilayer capacitor according to claim 1, wherein the first and second internal electrode groups are arranged along the laminating direction of the insulator layers in the capacitor element body.

7. The multilayer capacitor according to claim 1, wherein the external surface on which the first and second terminal electrodes are disposed constitutes a mounted surface to be opposed to another component.

8. A multilayer capacitor comprising:
a capacitor element body in which a plurality of insulator layers are laminated;
first and second terminal electrodes disposed on an external surface extending in a direction parallel to a laminating direction of the insulator layers, among external surfaces of the capacitor element body;
a first internal electrode group comprising a first internal electrode connected to the first terminal electrode, and a second internal electrode connected to the second terminal electrode; and
a second internal electrode group comprising a third internal electrode connected to the first terminal electrode, a fourth internal electrode connected to the second terminal electrode, and at least one intermediate internal electrode not connected to the first and second terminal electrodes;
wherein the first and second internal electrodes are arranged with the insulator layer in between so as to form a capacitance component between the first and second internal electrodes; and
wherein the third and fourth internal electrodes and the intermediate internal electrode are arranged with the insulator layer in between so as to form two or more capacitance components between the third and fourth internal electrodes,
wherein the first internal electrode has a first lead portion connected to the first terminal electrode,
wherein the second internal electrode has a second lead portion connected to the second terminal electrode,
wherein the third internal electrode has a third lead portion connected to the first terminal electrode,
wherein the fourth internal electrode has a fourth lead portion connected to the second terminal electrode, and
wherein a distance between the third lead portion and the fourth lead portion is smaller than a distance between the first lead portion and the second lead portion.

9. The multilayer capacitor according to claim 8, wherein the second internal electrode group comprises a first intermediate internal electrode opposed to the third and fourth internal electrodes, as said at least one intermediate internal electrode.

10. The multilayer capacitor according to claim 9, wherein the at least one intermediate internal electrode of the second internal electrode group further comprises second to fourth intermediate internal electrodes,
wherein the second intermediate internal electrode is opposed to the third internal electrode and the third intermediate internal electrode, and
wherein the fourth intermediate internal electrode is opposed to the fourth internal electrode and the third intermediate internal electrode.

11. The multilayer capacitor according to claim 8, wherein the second internal electrode group comprises second to fourth intermediate internal electrodes as said at least one intermediate internal electrode,
wherein the second intermediate internal electrode is opposed to the third internal electrode and the third intermediate internal electrode, and
wherein the fourth intermediate internal electrode is opposed to the fourth internal electrode and the third intermediate internal electrode.

12. The multilayer capacitor according to claim 8, wherein the second internal electrode group includes two types of internal electrode groups, an internal electrode group having a first intermediate internal electrode and an internal electrode group having second to fourth intermediate internal electrodes,
wherein the first intermediate internal electrode is opposed to the third and fourth internal electrodes,
wherein the second intermediate internal electrode is opposed to the third internal electrode and the third intermediate internal electrode, and
wherein the fourth intermediate internal electrode is opposed to the fourth internal electrode and the third intermediate internal electrode.

13. The multilayer capacitor according to claim 8, wherein the first and second internal electrode groups are arranged along the laminating direction of the insulator layers in the capacitor element body.

14. The multilayer capacitor according to claim 8, wherein the external surface on which the first and second terminal electrodes are disposed constitutes a mounted surface to be opposed to another component.

* * * * *